United States Patent
Leonard (12)

(10) Patent No.: US 9,296,272 B2
(45) Date of Patent: Mar. 29, 2016

(54) GAS SPRING AND GAS DAMPER ASSEMBLY AND METHOD

(75) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 13/879,875

(22) PCT Filed: Oct. 18, 2011

(86) PCT No.: PCT/US2011/056775
§ 371 (c)(1),
(2), (4) Date: Apr. 17, 2013

(87) PCT Pub. No.: WO2012/054531
PCT Pub. Date: Apr. 26, 2012

(65) Prior Publication Data
US 2013/0207329 A1    Aug. 15, 2013

Related U.S. Application Data

(60) Provisional application No. 61/394,335, filed on Oct. 18, 2010, provisional application No. 61/531,886, filed on Sep. 7, 2011.

(51) Int. Cl.
*B60G 15/12* (2006.01)
*B60G 15/06* (2006.01)
(Continued)

(52) U.S. Cl.
CPC ............. *B60G 15/12* (2013.01); *B60G 11/62* (2013.01); *B60G 15/06* (2013.01); *B60G 15/08* (2013.01);
(Continued)

(58) Field of Classification Search
CPC ........ B60G 15/06; B60G 15/12; B60G 11/27;
B60G 11/62; B60G 17/08; B64C 25/60;
B64F 2700/6242; F16F 9/02; F16F 9/06;
F16F 9/063; F16F 9/486; F16F 9/0472;
F16F 13/002
USPC ............. 267/220, 64.21, 64.24, 140.13, 136,
267/64.19, 64.23, 64.25, 64.26, 64.27,
267/64.28, 122
See application file for complete search history.

(56) References Cited

U.S. PATENT DOCUMENTS 3,000,624 A * 9/1961 Cislo ..................... B60D 17/04
137/627.5
3,000,625 A * 9/1961 Polhemus ............... F16F 9/084
267/64.24
(Continued)

FOREIGN PATENT DOCUMENTS

DE     199 59 839 A1    7/2000
EP       0 000 287 A1    1/1979
(Continued)

OTHER PUBLICATIONS

International Search Report.

*Primary Examiner* — Anna Momper
*Assistant Examiner* — San Aung
(74) *Attorney, Agent, or Firm* — Jason A. Houser; Fay Sharpe LLP

(57) ABSTRACT

A gas spring and gas damper assembly can include a gas spring and a gas damper. The gas spring can include a first end member, a second end member and a flexible wall that at least partially form a spring chamber. The gas damper can include first, second and third damper elements that are telescopically interconnected with one another. At least one of the first and third damper elements can be operatively connected to the first and second end members by way of a low-profile misalignment mount capable of undergoing resilient angular deflection. The second damper element can be operatively supported between the first and third damper elements. A method of assembling a gas spring and gas damper assembly is also included.

20 Claims, 15 Drawing Sheets

(51) Int. Cl.
*B60G 11/62* (2006.01)
*F16F 13/00* (2006.01)
*F16F 9/02* (2006.01)
*B60G 15/08* (2006.01)
*F16F 9/04* (2006.01)
*F16F 9/05* (2006.01)
*F16F 9/32* (2006.01)
*F16F 9/36* (2006.01)
*F16F 9/58* (2006.01)

(52) U.S. Cl.
CPC ............... *F16F 9/02* (2013.01); *F16F 9/0209* (2013.01); *F16F 9/0454* (2013.01); *F16F 9/0472* (2013.01); *F16F 9/05* (2013.01); *F16F 9/052* (2013.01); *F16F 9/3242* (2013.01); *F16F 9/36* (2013.01); *F16F 9/368* (2013.01); *F16F 9/585* (2013.01); *F16F 13/002* (2013.01); *B60G 2202/314* (2013.01); *B60G 2204/1262* (2013.01); *B60G 2204/41* (2013.01); *B60G 2206/40* (2013.01); *B60G 2206/91* (2013.01); *Y10T 29/49609* (2015.01)

(56) References Cited

U.S. PATENT DOCUMENTS

| | | | | |
|---|---|---|---|---|
| 3,246,905 | A | * | 4/1966 | Morgan ............... B60G 17/002 188/282.6 |
| 4,635,745 | A | | 1/1987 | Myers et al. |
| 4,712,776 | A | * | 12/1987 | Geno ..................... B60G 15/14 188/322.12 |
| 6,116,584 | A | * | 9/2000 | Romer ................. B60G 13/003 267/34 |
| 6,286,820 | B1 | * | 9/2001 | Raulf ..................... B60G 15/14 267/64.21 |

FOREIGN PATENT DOCUMENTS

| | | |
|---|---|---|
| FR | 2 216 482 A1 | 8/1974 |
| WO | WO 02/098686 A1 | 12/2002 |
| WO | WO 2009/124742 A1 | 10/2009 |
| WO | WO 2010/006167 A2 | 1/2010 |

\* cited by examiner

GAS SPRING AND GAS DAMPER ASSEMBLY AND METHOD

BACKGROUND

The present disclosure broadly relates to the art of spring devices and, more particularly, to a gas spring and gas damper assembly as well as a vehicle suspension system that includes such a gas spring and gas damper assembly and a method of operating such a gas spring and gas damper assembly.

A suspension system, such as may be used in connection with motorized vehicles, for example, can include one or more spring elements for accommodating forces and loads associated with the operation and use of the corresponding device (e.g., a motorized vehicle) to which the suspension system is operatively connected. In such applications, it is often considered desirable to utilize spring elements that operate at a lower spring rate, as a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Such suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. One example of such damping components are conventional shock absorbers that are commonly used in vehicle suspension systems.

In other arrangements, however, the dampers or damping components can be of a type and kind that utilizes gas rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Patent Application Publication No, 2003/0173723. Generally, there is some resistance to the movement of pressurized gas through these passages or ports, and this resistance acts to dissipate energy associated with the gas spring portion and thereby provide some measure of damping.

One factor that may be limiting the broader adoption and use of gas spring and gas damper assemblies relates to the significant travel of which gas spring devices are capable. That is, gas spring devices are capable of being displaced between a minimum or compressed height and a maximum or extended height and the difference in these overall heights can be substantial.

Certain difficulties relating to the incorporation of gas dampers into gas spring devices have been associated with the aforementioned differences in overall height of gas spring devices. At one extreme, the minimum or compressed height of a gas spring device will act to limit the overall length of components that can be housed within the gas spring device. At the other extreme, any components housed within the gas spring device should remain operatively connected between the opposing end members of the gas spring device in the extended condition thereof.

Accordingly, it is desired to develop a gas spring and gas damper assembly as well as a suspension system and method of assembly that overcome the foregoing and other difficulties associated with known constructions.

BRIEF DESCRIPTION

One example of a gas spring assembly including an associated internal device can have a longitudinal axis and can include a first end member and a second end member disposed in longitudinally-spaced relation to the first end member. A flexible wall can be secured between the first and second end members, and can extend circumferentially about the axis to at least partially define a spring chamber. A low-profile misalignment mount that is capable of undergoing resilient angular deflection can be operatively connected between one of the end members and an end of the associated internal device with the opposing end of the associated internal device operatively connected to the other end member.

In some case, the low-profile misalignment mount of the foregoing paragraph can include a retainer plate operatively connected to the first end member and in spaced relation thereto such that a cavity is disposed between the retainer plate and the first end member. An end plate can be disposed within the cavity and can be secured along an end of the associated internal device. A first bushing element can be disposed between the first end member and the end plate, and a second bushing element can be disposed between the retaining plate and the end plate such that the first and second bushing elements can deform as the first end member and the associated internal device undergo angular displacement relative to one another.

Another example of a gas spring and gas damper assembly in accordance with the subject matter of the present disclosure can include a gas spring assembly and a gas damper assembly. The gas spring assembly can having a longitudinal axis, and can include a first end member and a second end member that is disposed in longitudinally-spaced relation to the first end member. A flexible wall can be secured between the first and second end members and can extend circumferentially about the longitudinal axis to at least partially define a spring chamber between the first and second end members. The gas damper assembly can be disposed within the spring chamber of the gas spring assembly and can be operatively connected between the first and second end members. The gas damper assembly can include a first damper element that is operatively connected to the first end member. The first damper element can include a first wall that at least partially defines a first damping chamber. A second damper element can include a first end received within the first damping chamber and an opposing second end that projects outwardly from the first damping chamber. The second damper element can include a second wall that at least partially defines a second damping chamber with the second damping chamber being accessible from outside the first damping chamber. The second damper element can be reciprocally displaceable in an approximately longitudinal direction with respect to the first damper element. A third damper element can include a first end that is operatively connected to the second end member and an opposing second end that is received within the second damping chamber of the second damper element. The second end can be capable of reciprocal movement with respect to the second side wall of the second damper element.

A further example of a gas spring and gas damper assembly in accordance with the subject matter of the present disclosure can include a gas spring and a gas damper. The gas spring can have a longitudinal axis and can include a first end member, a second end member that is spaced longitudinally from the first end member, and a flexible wall that extends circumferentially about the longitudinal axis and is operatively connected between the first and second end members such that a spring chamber is at least partially defined therebetween. The gas damper can be disposed within the spring chamber and can be operatively connected between the first and second end members. The gas damper can include a first damper element that is operatively connected to the first end member and can include a first side wall that at least partially defines a first damping chamber. A second damper element can extend longitudinally between a first end and a second end that is opposite the first end. The second damper element can include an end wall and a second side wall that at least partially defines a second damping chamber. The end wall can be disposed transverse to the second side wall and can at least partially form a second element piston. The second damper element can be oriented such that the second element piston and at least a portion of the second side wall are disposed within the first damping chamber. The second damper element can be slidably supported within the first damping chamber such that the end wall is displaceable relative to the first side wall of the first damper element. A third damper element can be operatively connected to the second end member and can include a damper rod and a third element piston disposed along the damper rod in spaced relation to the second end member. The third damper element can be oriented such that the third element piston and at least a portion of the damper rod are disposed within the second damping chamber. The third damper element can be displaceable relative to the second side wall of the second damper element. A first mount capable of undergoing resilient angular deflection can operatively connect one of the first damper element and the third damper element to the first end member of the gas spring assembly. A second mount can operatively connect the other of the first damper element and the third damper element to the second end member of the gas spring assembly.

One example of a method of assembling a gas spring and gas damper assembly in accordance with the subject matter of the present disclosure can include providing a first damper element that includes a first side wall that at least partially defines a first damping chamber. The method can also include providing a second damper element extending longitudinally between a first end and a second end opposite the first end. The second damper element can include an end wall and a second side wall that at least partially defines a second damping chamber. The end wall can be disposed transverse to the second side wall and can at least partially forming a second element piston. The method can further include positioning the second element piston and at least a portion of the second side wall within the first damping chamber such that the second damper element can be slidably supported within the first damping chamber and the second element piston can be displaceable relative to the first side wall of the first damper element. The method can also include providing a third damper element that can include a damper rod and a third element piston disposed along the damper rod. The method can also include positioning the third damper element such that the third element piston and at least a portion of the damper rod are disposed within the second damping chamber. The method can further include providing a first end member, a second end member and a flexible wall. The method can also include providing a first mount capable of undergoing resilient angular deflection and securing one of the first and third damper elements to the first end member using the first mount such that the first end member and the one of the first damper element and the third damper element can be capable of undergoing angular displacement relative to one another. The method can further include providing a second mount and securing the other of the first and second damper elements to the second end member using the second mount. The method can also include securing the flexible wall between the first and second end members such that a spring chamber is at least partially formed by the flexible wall between the first and second end member with the spring chamber containing at least the first, second and third damper elements.

DETAILED DESCRIPTION

Figure 1:
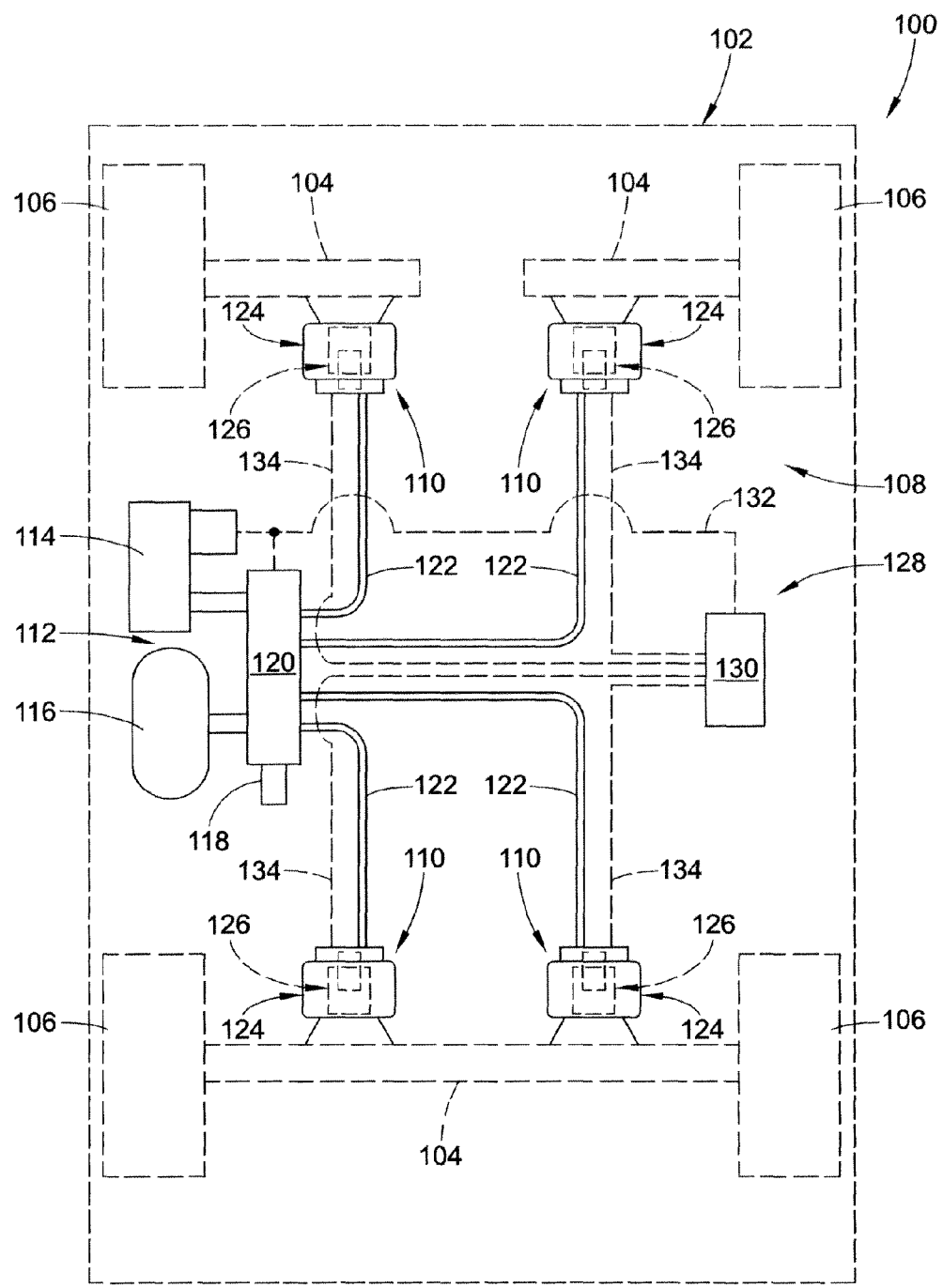
FIG. 1 is a schematic representation of one example of a vehicle including a suspension system utilizing gas spring and gas damper assemblies in accordance with the subject matter of the present disclosure.

Turning now to the drawings wherein the showings are for the purpose of illustrating exemplary embodiments of the present novel concept and not for limiting the same, FIG. 1 illustrates a vehicle 100 having a sprung mass, such as a vehicle body 102, for example, and an unsprung mass, such as axles 104 and/or wheels 106, for example. Additionally, vehicle 100 can include a suspension system 108 that is operatively connected between the sprung and unsprung masses. The suspension system can include a plurality of gas spring and gas damper assemblies 110 that are operatively connected between the sprung and unsprung masses of the vehicle. Assemblies 110 can be disposed between the sprung and unsprung masses in any suitable manner, configuration and/or arrangement. For example, assemblies 110 are shown in FIG. 1 as being disposed adjacent wheels 106. Depending on desired performance characteristics and/or other factors, the suspension system may, in some cases, also include damping members (not shown) of a typical construction that are provided separately from assemblies 110 and secured between the sprung and unsprung masses in a conventional manner. In a preferred arrangement, however, gas spring and gas damper assemblies 110 will be sized, configured and operative to provide the desired performance characteristics for the suspension system without the use of additional damping members (e.g., conventional struts or shock absorbers) that are separately provided.

Vehicle 100 also includes a pressurized gas system 112 that is in communication with assemblies 110 and that is operative to selectively supply pressurized gas thereto and exhaust pressurized gas therefrom. Pressurized gas system 112 can include a pressurized gas source, such as a compressor 114, and can optionally include a storage vessel, such as a reservoir 116, for example, for receiving and storing pressurized gas, such as may be generated by the pressurized gas source. System 112 can further include a suitable exhaust, such as a muffler 118, for example, for venting pressurized gas from the system.

Pressurized gas system 112 can be in communication with the gas spring and gas damper assemblies in any suitable manner. For example, system 112 can include a valve assembly 120 or other suitable device or arrangement for selectively distributing pressurized gas to, from and/or between the pressurized gas source or sources, the exhaust and/or the gas spring and gas damper assemblies. As shown in the exemplary embodiment in FIG. 1, compressor 114, reservoir 116 and muffler 118 are in fluid communication with valve assembly 120 and can be selectively placed in fluid communication with one another by way of the valve assembly. Additionally, assemblies 110 are in fluid communication with valve assembly 120 by way of gas transmission lines 122 and, thus, can be selectively placed in communication with the compressor, reservoir, muffler and/or one another by way of the valve assembly.

It will be appreciated that gas spring and gas damper assemblies 110 can take any suitable form, configuration and/or construction in accordance with the present novel concept. In the embodiment shown in FIG. 1, each assembly 110 includes a gas spring assembly 124 and a gas damper assembly, which is schematically represented in FIG. 1 by item number 126, that is substantially-entirely contained within gas spring assembly 124. Gas spring assemblies 124 include a spring chamber (not numbered) that is operative to receive and retain a quantity of pressurized gas. Gas damper assemblies 126 can include a plurality of components that are telescopically interconnected with one another and at least partially define a plurality of damping chambers. In some cases, one of the gas dampers can be at least partially received within the spring chamber of a gas spring assembly with one or more of the damping chambers being in fluid communication with the spring chamber of the gas spring assembly.

In operation of the exemplary embodiment shown in FIG. 1, valve assembly 120 can be selectively actuated to transfer pressurized gas from the compressor and/or reservoir to one or more of gas spring and gas damper assemblies 110 via one or more of gas transmission lines 122. Additionally, valve assembly 120 can be selectively actuated to exhaust pressurized gas from one or more of the gas spring and gas damper assemblies through the gas transmission lines, such as by way of muffler 118 or another suitable arrangement. It will be appreciated that the foregoing pressurized gas system and operation thereof are merely exemplary and that other suitable pressurized gas sources, systems and/or methods of operation could alternately be used without departing from the subject matter of the present disclosure.

Vehicle 100 also includes a suspension control system 128 for selectively operating, adjusting or otherwise influencing or controlling the performance or one or more suspension system components, such as gas spring and gas damper assemblies 110 and/or pressurized gas system 112, for example. Suspension control system 128 can include an electronic control unit 130 in communication with one or more components of valve assembly 120, such as through a communication line 132, for example, for selective actuation and/or operation thereof. Electronic control unit 130 is also shown in FIG. 1 as being in communication with suitable height sensing devices (not shown in FIG. 1) that can optionally be used in association with gas spring and gas damper assemblies 110. It will be appreciated that such communications can be implemented in any suitable manner, such as by way of communication lines 134, for example. Additionally, it will be appreciated that height sensors or other distance-determining devices of any suitable type, kind, construction and/or configuration can be used, such as mechanical linkage sensors, ultrasonic wave sensors or electromagnetic wave sensors, for example. Additionally, other sensors, sensing devices and/or other such components can also, optionally, be used in connection with suspension control system 128, such as pressure sensors, accelerometers and/or temperature sensors, for example.

Figure 2:
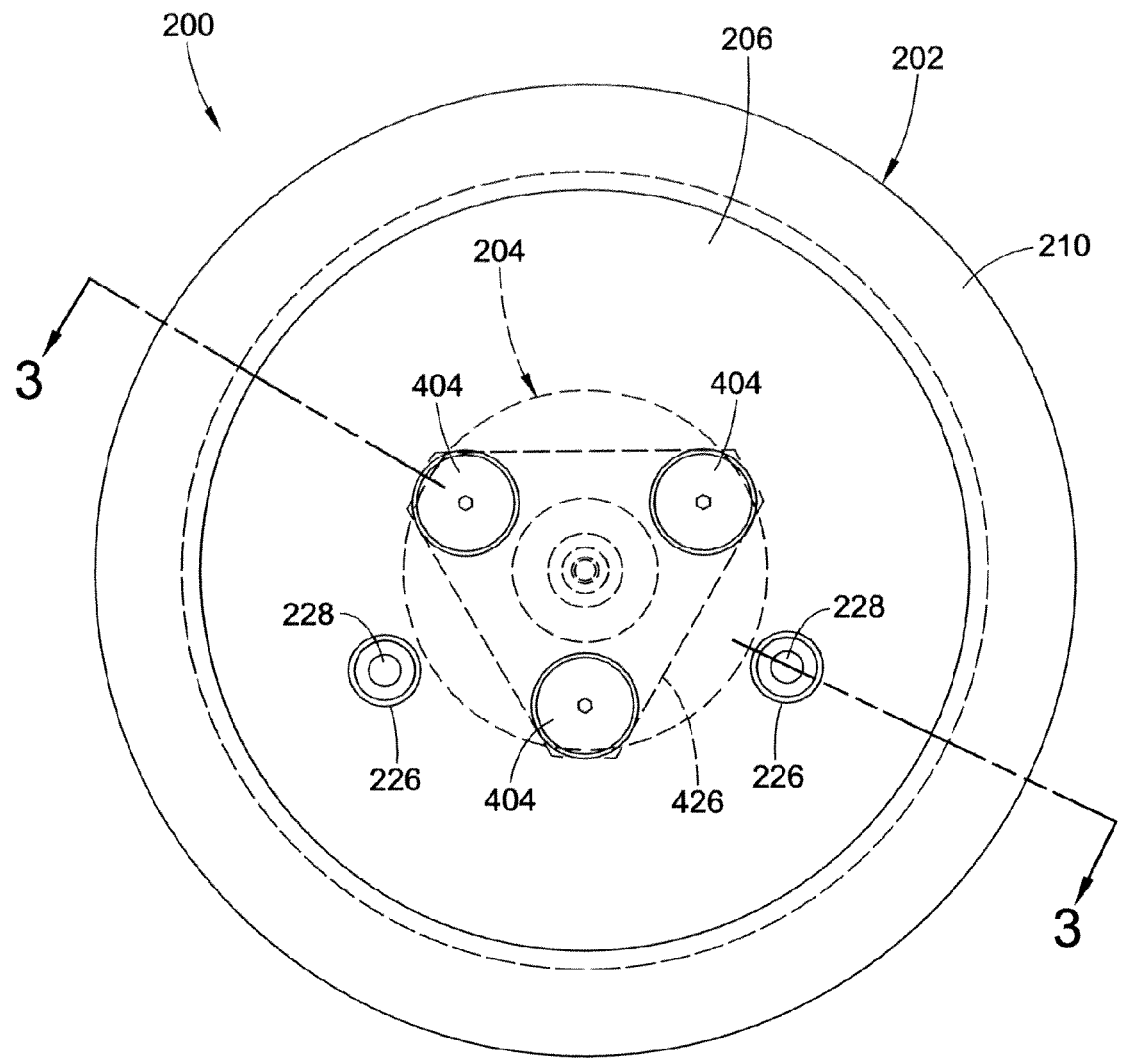
FIG. 2 is a top plan view of one example of a gas spring and gas damper assembly in accordance with the subject matter of the present disclosure.
Figure 3:
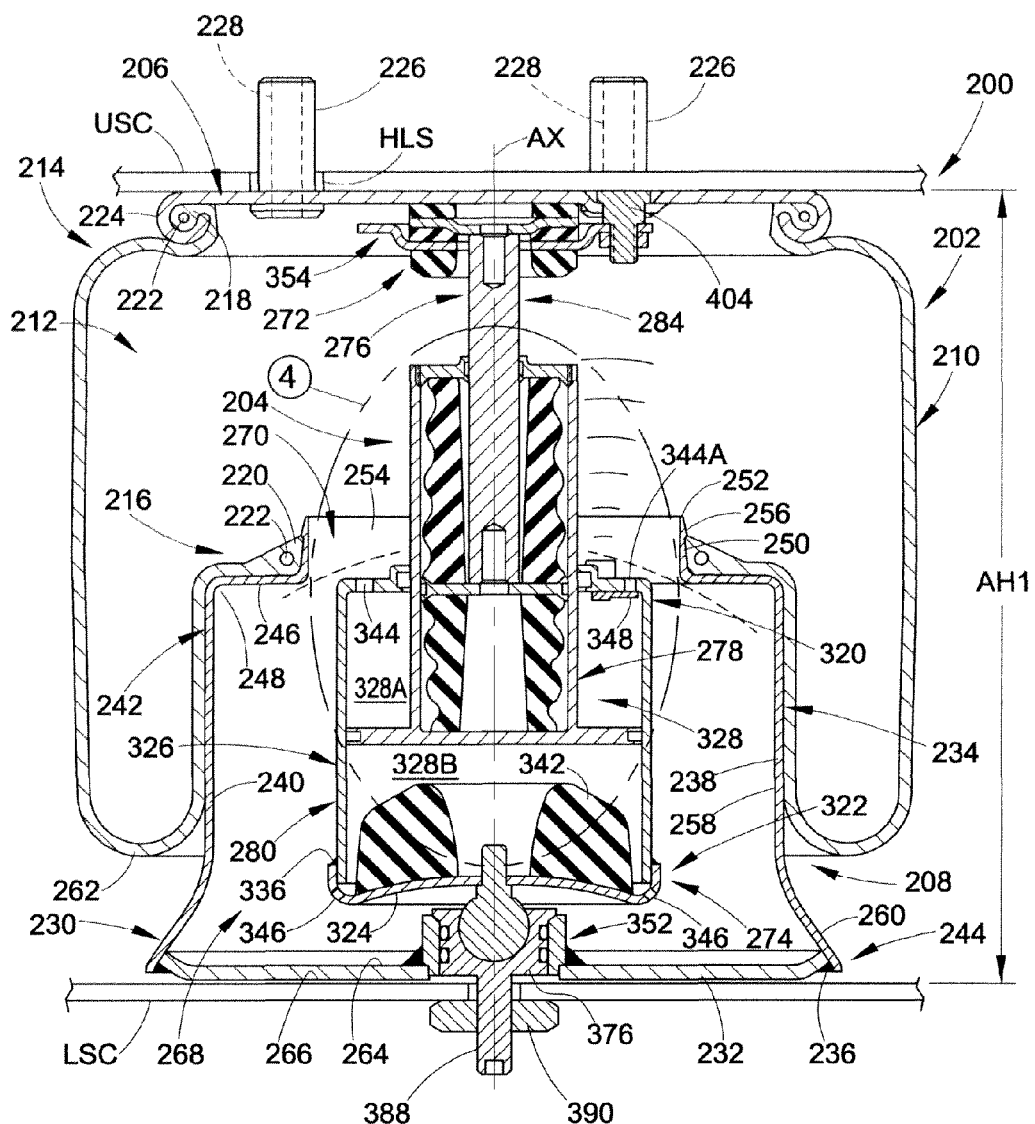
FIG. 3 is a cross-sectional side view of the gas spring and gas damper assembly shown in FIG. 2 taken from along line 3-3 thereof.

One example of a gas spring and gas damper assembly 200 in accordance with the subject matter of the present disclosure is shown in FIGS. 2-8. Gas spring and gas damper assembly 200 includes a gas spring assembly 202 and a gas damper assembly 204 that is substantially-entirely housed within the gas spring assembly. Gas spring assembly 202 can be of any type, kind, construction, configuration and/or arrangement, such as is shown in FIG. 1-7 as being of a rolling lobe-type construction, for example, and can have a longitudinal axis and can include a first end member, an opposing second end member spaced longitudinally from the first end member and a flexible wall that is operatively connected therebetween. It will be appreciated, however, that other gas spring assembly constructions could alternately be used, such as a convoluted bellow-type construction, for example. Additionally, gas spring assembly 202 can operatively connected between opposing structural components in any suitable manner, such as, for example, are generally represented in FIG. 3 by upper structural component USC (e.g., vehicle body 102 in FIG. 1) and lower structural component LSC (e.g., axle 104 in FIG. 1).

In the exemplary arrangement shown in FIGS. 2-8, gas spring assembly 202 has a longitudinally-extending axis AX and includes a first or upper end member, such as a bead plate 206, for example, and an opposing second or lower end member, such as a piston 208, for example, that is spaced longitudinally from the first end member. A flexible wall, such as a flexible sleeve 210, for example, can be secured between the first end member (e.g., bead plate 206) and the second end member (e.g., piston 208) in a suitable manner such that a spring chamber 212 is at least partially formed therebetween.

Flexible sleeve 210 extends in a generally longitudinal manner between a sleeve end 214 and a sleeve end 216. Flexible sleeve 210 includes a mounting bead 218 along sleeve end 214 and a mounting bead 220 along sleeve end 216. Mounting beads 218 and 220 can optionally include a reinforcing element or other suitable component, such as a bead wire 222, for example.

End 214 of flexible sleeve 210 can be secured on or along the end member in any suitable manner. For example, mounting bead 218 of the flexible sleeve can be captured by an outer peripheral edge 224 of bead plate 206. The peripheral edge can be deformed around mounting bead 218 in any manner suitable for forming a substantially fluid-tight seal therewith. One or more securement devices, such as mounting studs 226, for example, can be included along bead plate 206 and project through the associated structural component (e.g., upper structural component USC) in a manner suitable for receiving a corresponding securement device or element (not shown) to secure the first end member to the associated structural component. In the exemplary embodiment shown in FIG. 3, mounting studs 226 project axially outwardly from the bead plate and extend through holes HLS in upper structural component USC.

Additionally, a fluid communication port, such as a fluid passage 228, for example, can optionally be provided on or along the first or upper end member to permit fluid communication with spring chamber 212. In the exemplary embodiment shown, fluid passages 228 extend through mounting studs 226 and are in fluid communication with the spring chamber. It will be appreciated, however, that any other suitable fluid communication arrangement could alternately be used.

Mounting bead 220 of flexible sleeve 210 can be secured to the second end member in any suitable manner. As one example, the mounting bead could be retained on or along the piston using one or more retaining elements or components (e.g., crimp rings or retaining caps). As another example, mounting bead 220 could be friction fit along a wall portion of piston 208 and, optionally, at least partially retained thereon using a radially outwardly-extending projection. It will be appreciated, however, that any other suitable arrangement and/or configuration could alternately be used.

In the exemplary embodiment in FIGS. 3 and 5-7, for example, piston 208 is shown as including piston body 230 that is formed from a base member 232 and an outer shell 234, which is operatively connected to the base member such that a substantially fluid-tight seal is formed therebetween, such as through the use of a flowed-material joint 236 extending circumferentially about axis AX, for example. It will be appreciated, however, that in other cases, a piston body could be used in which the base member and outer shell are integrally formed with one another, such as through the use of an injection molding process, for example. In such case, the base member could be alternately referred to as a base portion or base member portion, and the outer shell could be alternately referred to as an outer shell portion.

Outer shell (or outer shell portion) 234 includes a shell wall 238 that extends circumferentially about axis AX. Shell wall 238 includes an outer side wall portion 240 that extends in a generally longitudinal direction between an end 242, which is disposed toward bead plate 206, and an end 244, which is disposed in longitudinally spaced relation to end 242 and toward lower structural component LSC. Shell wall 238 also includes an end wall portion 246 that transitions into outer side wall portion 240 at a curved or shoulder portion 248. An inner side wall portion 250 projects from end wall portion 246 in a direction extending axially away from end 244. Inner side wall portion 250 terminates in the axial direction at an end 252. Additionally, inner side wall portion 250 includes an outer surface (not numbered) facing radially outward and an inner surface 254 facing radially inward. A projection 256 extends radially-outwardly from along the outer surface adjacent end 252 of inner side wall portion 250.

It will be recognized that a wide variety of shapes, profiles and/or configurations can and have been used in forming the outer side wall of a gas spring piston. As such, it will be appreciated that outer side wall portion 240 of shell wall 238 can be of any suitable shape, profile and/or configuration and that the profile shown in FIGS. 2-7 is merely exemplary. Mounting bead 220 of flexible sleeve 210 can be received on or along the outer surface of inner side wall portion 250 such that a substantially fluid-tight seal is formed therebetween with projection 256 at least partially retaining mounting bead 220 on inner side wall portion 250. Additionally, outer side wall portion 240 of shell wall 238 includes an inside surface 258 and an outside surface 260. As such, a portion of flexible sleeve 210 extends along end wall portion 246 and outside surface 260 of outer side wall portion 240 such that a rolling lobe 262 is formed along piston body 230 and is displaced along the outer side wall portion as the gas spring assembly undergoes changes in overall height.

Base member 232 includes an inside surface 264 and an outside surface 266, which can be disposed in abutting engagement with lower structural component LSC. Inside surface 264 of base member 232 and inside surface 258 of outer side wall portion 240 at least partially define a piston chamber 268 within piston 208. Inner surface 254 of inner side wall portion 250 at least partially defines an opening or passage 270 into piston 208 by which piston chamber 268 is in fluid communication with spring chamber 212. In a preferred arrangement, inner surface 254 defines an opening or passage (e.g., passage 270) into piston chamber 268 that is of sufficient size to permit piston chamber 268 and spring chamber 212 to operate as a substantially unified fluid chamber. That is, in a preferred arrangement, passage 270 will be sufficiently large that minimal fluid flow restriction (e.g., approximate zero fluid flow restriction) will occur for pressurized gas flowing between spring chamber 212 and piston chamber 268 under typical conditions of operation.

Gas damper assembly 204 is shown in FIGS. 3-7 as being substantially entirely contained within gas spring assembly 202 and extending longitudinally between an end 272 that is operatively connected to bead plate 206 and an end 274 that is operatively connected to piston 208. Gas damper assembly 204 includes a plurality of damper elements that are operatively interconnected with one another for telescopic extension and compression in relation to corresponding extension and compression of gas spring assembly 202.

In the exemplary arrangement in FIGS. 3-7, gas damper assembly 204 is shown as including damper elements 276, 278 and 280 that are operatively interconnected with one another for telescopic extension and compression. Damper element 276 is operatively connected to the first end member (e.g., bead plate 206) and extends from the first end member toward the second end member (e.g., piston 208). Damper element 280 is operatively connected to the second end member (e.g. piston 208) and extends from the second end member toward the first end member (e.g., bead plate 206). Damper element 278 is disposed longitudinally between damper elements 276 and 280, and is operatively interconnected therewith such that damper elements 276 and 278 can move relative to one another and such that damper element 278 and 280 can move relative to one another.

Figure 4:
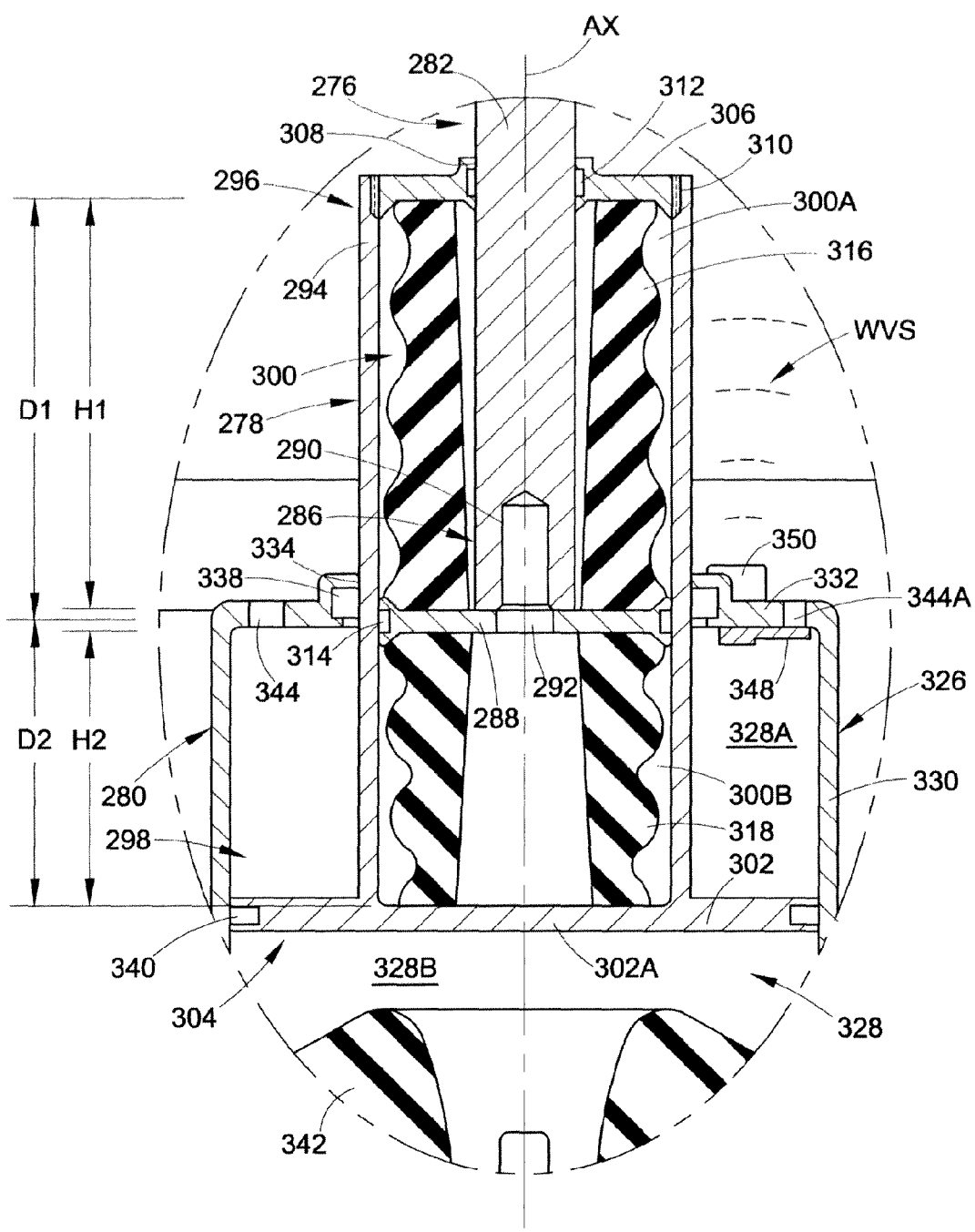
FIG. 4 is an enlarged, cross-sectional view of the portion of the gas spring and gas damper assembly in FIGS. 2 and 3 identified as Detail 4 in FIG. 3.

As shown in FIG. 4, damper element 276 includes a damper rod 282 that extends longitudinally from an end 284 (FIG. 3) to an end 286. A damper piston 288 is disposed along end 286 of damper rod 282 and can be attached or otherwise connected thereto in any suitable manner. For example, damper piston 288 could be integrally formed with damper rod 282. As another example, end 286 of damper rod 282 could include a securement feature, such as a threaded passage 290, for example. Damper piston 288 could include a hole 292 extending therethrough such that a securement device, such as a threaded fastener (not shown), for example, could be used to secure damper piston 288 along end 286 of damper rod 282.

Damper element 278 includes a side wall 294 extending circumferentially about axis AX between longitudinally-spaced ends 296 and 298 such that a longitudinally-extending damping chamber 300 is at least partially formed by side wall 294. A piston wall 302 extends radially outwardly beyond side wall 294 such that a damper piston 304 is formed along end 298 of damper element 278. An end wall 306 is secured across end 296 of side wall 294 and thereby further encloses and defines damping chamber 300. End wall 306 includes a passage wall 308 that at least partially defines a rod passage (not numbered) extending through the end wall. Additionally, an outer peripheral edge of end wall 306 can include a securement feature and end 296 of side wall 294 can include a securement feature that is complimentary to the securement feature of end wall 306, such that the end wall can be secured across the end of the side wall. In a preferred arrangement, a plurality of threads are disposed along the outer peripheral edge of end wall 306 and a corresponding plurality of thread are disposed along end 296 of side wall 294 such that a threaded connection 310 can be formed therebetween. While it will be appreciated that other securement features could alternately be used, one benefit of using a threaded connection, such as has been described above, is that the same facilitates assembly, as will be described in additional detail hereinafter.

As discussed above, damper elements 276 and 278 are operatively interengaged with one another for telescopic extension and compression. In the exemplary arrangement shown, damper piston 288 is disposed within damping chamber 300 and damper rod 282 extends out of damping chamber 300 through the rod passage (not numbered) that is at least partially defined by passage wall 308. As such, end 284 of damper rod 282 is disposed outwardly of damping chamber 300 and can be operatively connected along bead plate 206 in a suitable manner, such as will be described in additional detail hereinafter.

Damping chamber 300 is separated by damper piston 288 into chamber portions 300A and 300B. In some cases, it may be desirable to maintain chamber portions 300A and 300B in fluidic isolation from one another, such as by including one or more sealing elements (not shown) operatively disposed between damper piston 288 and side wall 294. Additionally, it may be desirable to include one or more sealing elements (not shown) between damper rod 282 and passage wall 308, such that a substantially fluid-tight seal is formed therebetween and such that damping chamber 300 and spring chamber 212 are fluidically isolated from one another through the rod passage. In such case, additional fluid communication ports (not shown) can be selectively provided in one or more of damper piston 288, end wall 306 and/or a central portion 302A of piston wall 302. Such additional fluid communication ports can be sized and configured to generate damping forces during relative movement between damper element 276 and damper element 278.

It will be recognized that significant frictional forces may be generated by the sealing arrangements described above in connection with the interface between damper piston 288 and side wall 294 as well as in connection with the interface between damper rod 282 and passage wall 308. In some cases, it may be desirable to avoid these frictional forces (or for other reasons) by forgoing the use of sealing elements along the interface between damper piston 288 and side wall 294 and/or along the interface between damper rod 282 and passage wall 308. In such case, a friction reducing bushing or wear band can, optionally, be disposed between the damper piston and the side wall and/or between the damper rod and the passage wall. As identified in FIG. 4, friction-reducing bushings or wear bands 312 and 314 are respectively disposed between damper piston 288 and side wall 294 and between damper rod 282 and passage wall 308.

Gas damper assembly 204 can also include at least one biasing element disposed within damping chamber 300 and can be operative to act between damper piston 288 and end wall 306 and/or central portion 302A of piston wall 302. In the exemplary arrangement shown in FIGS. 3-7, two biasing elements are included. Biasing element 316 is disposed within chamber portion 300A and is operative to act on and between damper piston 288 and end wall 306. Biasing element 318 is disposed within chamber portion 300B and is operative to act on and between damper piston 288 and central portion 302A of piston wall 302. One benefit of including a biasing element, such as biasing element 316 and/or 318, for example, within one or both of the chamber portions (e.g., chamber portions 300A and 300B) is that the biasing element can act as a bumper or cushion that impedes direct physical contact between damper piston 288 and a corresponding one of end wall 306 and/or central portion 302A of piston wall 302.

Another benefit of including a biasing element, such as biasing element 316 and/or 318, for example, within one or both of the chamber portions (e.g., chamber portions 300A and 300B) is that the biasing element(s) can act to establish and/or control the longitudinal position of damper element 278 relative to other components of the gas damper assembly, as will be discussed in greater detail hereinafter. Additionally, during operation, the longitudinal forces acting between damper element 276 and damper element 278 will deflect biasing elements 316 and 318 to varying degrees and in various manners, as will be described in greater detail hereinafter. It will be appreciated that a biasing force threshold will correspond with or otherwise have a relation to the spring rate of the one or more biasing elements (e.g., biasing elements 316 and/or 318). As such, it will be recognized that where two biasing elements are used, such as biasing elements 316 and 318, for example, the biasing elements could have different spring rates, such as, for example, by using different materials or combinations of materials for the biasing elements and/or by using different sizes, dimensions and/or proportions for the biasing elements.

As an example, biasing element 316 is disposed within chamber portion 300A and abuttingly engages damper piston 288 and end wall 306. Biasing element 316 is shown as including a first height, which is represented in FIG. 4 by reference dimension H1, and has a first spring rate, such as, for example, may be established or otherwise at least partially defined by the material (or combination of materials) from which the biasing element is formed and/or by the size, shape and/or proportions of the biasing element. Additionally, biasing element 318 is disposed within chamber portion 300B and abuttingly engages damper piston 288 and central portion 302A of piston wall 302. Biasing element 318 is shown as including a second height, which is represented in FIG. 4 by reference dimension H2, and has a second spring rate, such as, for example, may be established or otherwise at least partially defined by the material (or combination of materials) from which the biasing element is formed and/or by the size, shape and/or proportions of the biasing element. In some cases, the first and second spring rates may be approximately equal to one another. In other cases, however, the first and second spring rates may be different from one another such that the first spring rate is either greater or less than the second spring rate, as may be desirable for a particular application and/or use. Examples of suitable materials for use as or in forming biasing elements, such as elements 316 and/or 318, for example, can include elastomeric polymers, such as foamed and unfoamed polyurethane, foamed and unfoamed natural rubber, and foamed and unfoamed synthetic rubber, such as in the form of open-cell or closed-cell spring elements. Other examples can include biasing elements formed from metals, such as steel coil springs, for example.

As indicated above, biasing element 316 is shown as having a height H1 and biasing element 318 is shown as having a height H2 that is different from height H1. As such, it will be recognized that end wall 306 is disposed a first distance from damper piston 288, which first distance is represented in FIG. 4 by reference dimension D1, and central portion 302A of piston wall 302 is disposed a second distance from damper piston 288, which second distance is represented in FIG. 4 by reference dimension D2, with the first distance being greater than the second distance. Accordingly, central portion 302A of piston wall 302 is shown as being longitudinally positioned nearer to damper piston 288 and end wall 306 is shown as being longitudinally positioned further from damper piston 288. It will be appreciated, however, that the damper piston could alternately be longitudinally positioned approximately centrally between the end wall and the central portion of the piston wall, or the end wall could be nearer to the damper piston and the central portion of the piston wall could be further from the damper piston.

Damper element 280 is shown in FIGS. 3-7 as extending longitudinally between opposing ends 320 and 322 and including an end wall 324 disposed along end 322 and housing wall 326 that is secured to end wall 324 and at least partially defines a damping chamber 328 therebetween. End wall 324 is operatively connected on or along the second end member (e.g., piston 208). As identified in FIG. 4, housing wall 326 is shown as including a side wall portion 330 extending longitudinally from along end wall 324 toward an end wall portion 332 of the housing wall. End wall portion 332 of housing wall 326 includes a passage wall 334 that at least partially defines a damper passage (not numbered) extending therethrough. End wall 324 and housing wall 326 can be operatively connected to one another in any manner suitable for forming a substantially fluid-tight seal therebetween. As one example, a threaded connection (not shown), such as may be similar to threaded connection 310, for example, could be used in conjunction with one or more sealing elements (not shown) to form a substantially fluid-tight seal. As another example, a flowed-material joint 336 could be used.

As discussed above, damper elements 278 and 280 are operatively interengaged with one another for telescopic extension and compression. In the exemplary arrangement shown, a portion of damper element 278 is disposed within damping chamber 328 such that side wall 294 and end wall 306 of damper element 278 extend longitudinally-outwardly of damping chamber 328 through the damper passage (not numbered) that is at least partially defined by passage wall 334 within end wall portion 332. As such, end 296 of damper element 278 is disposed outwardly of damping chamber 328 and end 298 of damper element 278 is disposed within damping chamber 328, such that piston wall 302 extends radially-outwardly toward side wall portion 330 of housing wall 326 and separates damping chamber 328 into chamber portions 328A and 328B.

In some cases, it may be desirable to permit fluid communication between chamber portions 328A and 328B, such as by including one or more friction-reducing bushings or wear bands disposed along the interface between side wall 294 and passage wall 334 of end wall portion 332 of housing wall 326 and/or along the interface between piston wall 302 and side wall portion 330 of housing wall 326. In a preferred embodiment, however, chamber portions 328A and 328B are maintained in fluidic isolation from one another, such as by including one or more sealing elements 338 (FIG. 4) operatively disposed between side wall 294 and passage wall 334 of end wall portion 332 of housing wall 326. Additionally, such a preferred arrangement can include one or more sealing elements 340 (FIG. 4) disposed between piston wall 302 and side wall portion 330 of housing wall 326 such that a substantially fluid-tight seal is formed therebetween.

As discussed above, damper elements 278 and 280 are operatively interengaged with one another for telescopic extension and compression. As such, piston wall 302 of damper element 278 moves toward and away from end wall 324 of damper element 280 during operation and use of the gas damper assembly. A bumper or other cushioning element can optionally be disposed within either or both of chamber portions 328A and/or 328B such as may be useful to prevent or at least minimize the possibility of direct physical contact between piston wall 302 of damper element 278 and end wall 324 and/or end wall portion 332 of housing wall 326. As shown in FIGS. 3-7, a bumper 342 is disposed within chamber portion 328B and is supported along and secured to end wall 324 of damper element 280. It will be appreciated, however, that any other suitable arrangement could alternately be used. For example, the bumper could alternately be secured on along piston wall 302 of damper element 278.

As discussed above, sealing elements 338 and 340 are respectively disposed between side wall 294 and passage wall 334 of end wall portion 332 of housing wall 326 and between piston wall 302 and side wall portion 330 of housing wall 326, such that a substantially fluid-tight seals are formed therebetween. As such, in some cases, it may be desirable to permit fluid transfer into, out of and/or between chamber portions 328A and 328B depending upon the desired performance characteristics of gas damper assembly 204.

For example, the arrangement shown in FIGS. 3-7 includes a substantially fluid-tight seal formed between chamber portions 328A and 328B across piston wall 302. In some cases, piston wall 302 may include a passage or port (not shown) extending through the piston wall that would permit fluid communication between chamber portions 328A and 328B through or otherwise across the piston wall. In the alternative, housing wall 326 and/or end wall 324 can include one or more passages or ports extending therethrough that will permit pressurized gas transfer into and out of chamber portion 328A and/or 328B. For example, end wall portion 332 of housing wall 326 can include one or more passage or ports 344 extending therethrough that permit pressurized gas transfer into and out of chamber portion 328A of damping chamber 328. Additionally, end wall 324 can include one or more passages or ports 346 extending therethrough that permit pressurized gas transfer into and out of chamber portion 328B of damping chamber 328. Furthermore, one or more of the passages or ports provided on or along the walls or wall portions (e.g., end wall 324, and portions 330 and/or 332 of housing wall 326) of damper element 280 can optionally include a flow control valve that restricts pressurized gas flow through the corresponding passage or port to flow in a single direction. For example, end wall portion 332 includes a passage or port 344A that extends therethrough. A unidirectional or single direction flow control valve of a suitable type, kind and/or construction is disposed on or along the end wall portion and restricts pressurized gas flow to a single direction. In the exemplary arrangement shown in FIGS. 3-7, a one-way valve 348 is fluidically associated with passage 344A and permits pressurized gas transfer into chamber portion 328A through passage 344A while substantially inhibiting pressurized gas transfer out of chamber portion 328A through passage 344A. As such, in the exemplary arrangement shown, pressurized gas transfer out of chamber portion 328A occurs only through the remaining one or more of passages 344.

Gas spring and gas damper assembly 200 is shown in FIG. 3 supported between upper and lower structural components USC and LSC and having an assembly height, which is represented in FIG. 3 by reference dimension AH1, that corresponds to an initial height condition of the gas spring and gas damper assembly. In some cases, such an initial height condition may be referred to as a design height. At such a design height, rolling lobe 262 is disposed approximately at a design position along side wall portion 240 of piston 208. Additionally, at such a design height, damper piston 288 is disposed at a design position along side wall 294 within damping chamber 300, which, in turn, acts to position piston wall 302 of damper piston 304 at a design position along side wall portion 330 within damping chamber 328.

Figure 5:
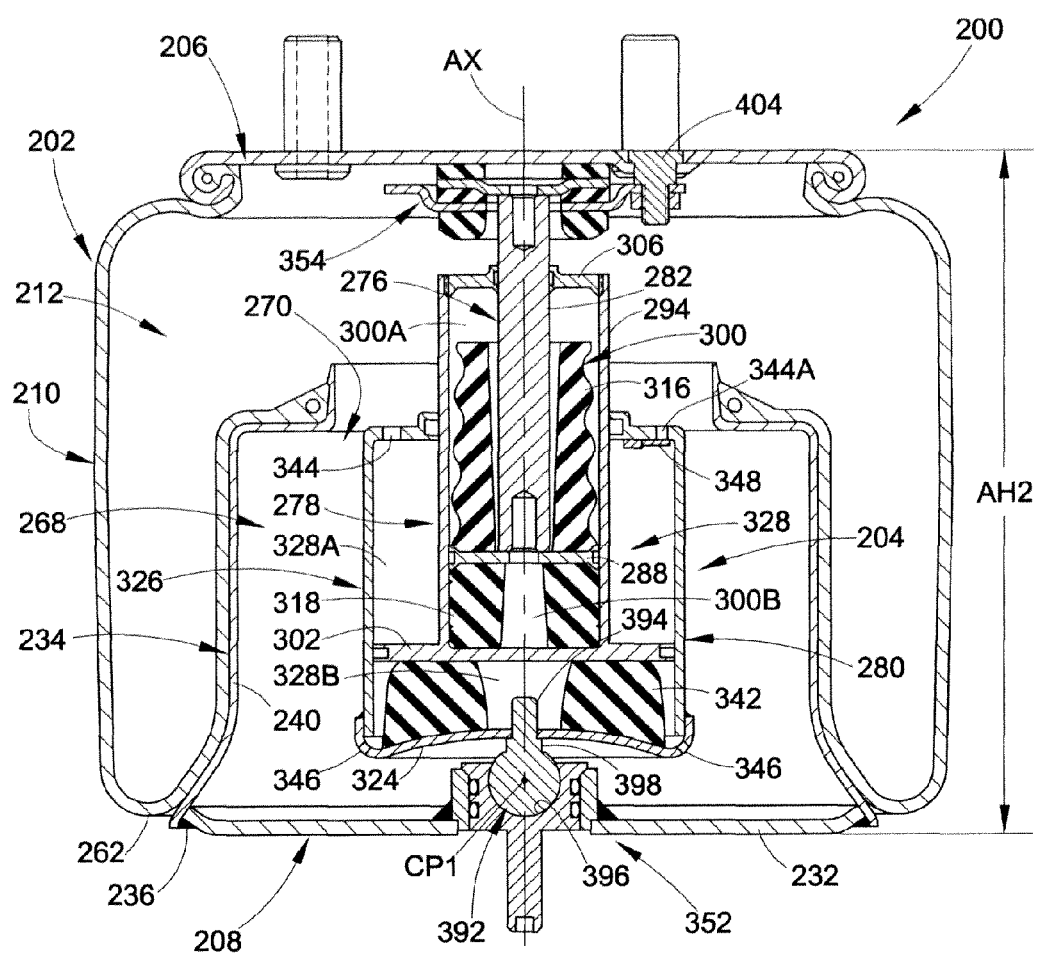
FIG. 5 is a cross-sectional side view of the gas spring and gas damper assembly in FIGS. 2-4 shown in a compressed condition.

As gas spring and gas damper assembly 200 is displaced into a compressed condition, which may be referred to in the art as a jounce condition, bead plate 206 and piston 208 are moved toward one another and may reach a compressed height, which is represented in FIG. 5 by reference dimension AH2, that is less than design height AH1. As bead plate 206 and piston 208 are displaced toward one another, damper rod 282 and damper piston 288 of damper element 276 are also displaced toward piston 208. Initially, the longitudinal forces acting on damper element 276 may be insufficient to further compress biasing element 318, which, due to the direction of displacement, could be compressively loaded during such displacement. As such, biasing element 318 may remain in approximately the same compressive condition and thereby transfer the longitudinal forces acting on damper element 276 into damper element 278. In which case, damper element 278 would compress the pressurized gas contained within chamber portion 328B and urge a portion of the pressurized gas to flow out of the chamber portion through passages 346 in end wall 324 and into piston chamber 268. It will be recognized that upon sizing and configuring passages 346 such that an appropriate total orifice area (e.g., total cross-sectional area for the active passages) for a given application is provided, such a flow of pressurized gas through passages 346 can operate to dissipate a portion of the energy acting on assembly 200 and thereby provide a damping action thereto.

As damper element 278 is displaced toward end wall 324, damper piston 304 will contact bumper 342. As discuss above, bumper 342 may also operate as a biasing element that includes a spring rate and that will deflect upon the application of a sufficiently-high longitudinal force thereto. Upon contacting bumper 342 with such a sufficiently-high force, damper piston 304 of damper element 278 will continue to urge pressurized gas through passages 346 and will also compress bumper 342, such as is shown in FIG. 5, for example. In some cases, bumper 342 may be compressed or otherwise deformed by an amount sufficient to fluidically isolate passages 346 from chamber portion 328B and thereby prevent further flow of pressurized gas through passages 346. In other cases, however, bumper 342 may be configured such that passages 346 remain in fluid communication with chamber portion 328B even at the maximum deformation of bumper 342.

Additionally, upon contacting bumper 342 or at some point earlier thereto or occurring thereafter, the longitudinal force acting on damper element 276 may result in biasing element 318 being compressed or otherwise deflected, such as is shown in FIG. 5, for example, thereby permitting damper piston 288 to translate along side wall 294 in a direction toward piston wall 302. During assembly of damper element 278, it may be desirable to preload biasing elements 316 and 318. As such, biasing element 316 may expand slightly upon translation of damper piston 288 toward piston wall 302. Depending upon the magnitude of the translation of damper piston 288 toward piston wall 302, biasing element 316 may separate from end wall 306. While it will be appreciated that the preload level of biasing elements 316 and 318 may vary from application to application, one exemplary range for the preload level can be from approximately 2% to approximately 15% of the design load of the gas spring assembly.

Furthermore, it will be recognized that as assembly 200 is compressed, the gas pressure within spring chamber 212 and piston chamber 268 increases, at least temporarily. It has been recognized that gas damping has a relationship to the magnitude of the difference between the pressure of the gas within the damping chamber (e.g., chamber portion 328B) and the pressure of the gas into which the gas from the damping chamber flows (e.g., piston chamber 268). Thus, increasing the pressure within the damping chamber (e.g., chamber portion 328B) and/or decreasing the pressure of the surrounding gas into which the gas from the damping chamber flows (e.g., piston chamber 268) can result in improved damping performance.

In addition to acting as a biasing element and preventing direct contact between piston wall 302 and end wall 324, bumper 342 may also improve the damping performance of damper 204 during compression by taking up volume within chamber portion 328B and thereby causing the gas pressure within the chamber portion to increase at a faster rate. In a preferred arrangement, gas damper assembly 206 will operate to build gas pressure within chamber portion 328B at the same or a faster rate than the rate at which the pressure is increasing within the spring and piston chambers due to compression of assembly 200. In such case, the same or a greater differential pressure can be achieved, which is expected to result in improved gas damping performance.

As described above, end wall portion 332 of housing wall 326 includes one or more passages 344 extending therethrough in fluid communication with chamber portion 328A of damping chamber 328. As damper piston 304 of damper element 278 is displaced toward end wall 324 of damper element 280, the volume of chamber portion 328A increases, which may initially result in a reduced pressure level within the chamber portion. As discussed above, however, the pressure level within spring chamber 212 and piston chamber 268 is increasing at this same time. As such, a portion of the pressurized gas within the spring and piston chambers will flow through passages 344 and into chamber portion 328A, upon sizing and configuring passages 344 such that an appropriate total orifice area (e.g., total cross-sectional area for the active passages) for a given application is used. Additionally, one or more of passages 344, such as passage 344A, for example, can be operatively associated with a one-way flow control device, such as valve 348, for example, that will permit additional pressurized gas transfer into chamber portion 328A while permitting an appropriate total orifice area to be used for damping purposed during displacement of the assembly in the opposing direction (i.e., during extension).

One benefit of permitting pressurized gas from the spring and piston chambers to flow into chamber portion 328A is that an overall reduction in the pressure within spring chamber 212 and piston chamber 268 can be achieved. And, as discussed above, improved damping performance can result from increasing the differential pressure between the gas within the damping chamber (e.g., chamber portion 328B) and the pressure of the gas into which the gas from the damping chamber flows (e.g., piston chamber 268). Another benefit of permitting pressurized gas from the spring and piston chambers to flow into chamber portion 328A is that the gas pressure within chamber portion 328A is at least temporarily increased. As will be discussed in greater detail hereinafter, such an increased pressure level can provide a further increased pressure differential between the gas within chamber portion 328A and the gas into which the gas from chamber portion 328A will flow during extension.

Figure 6:
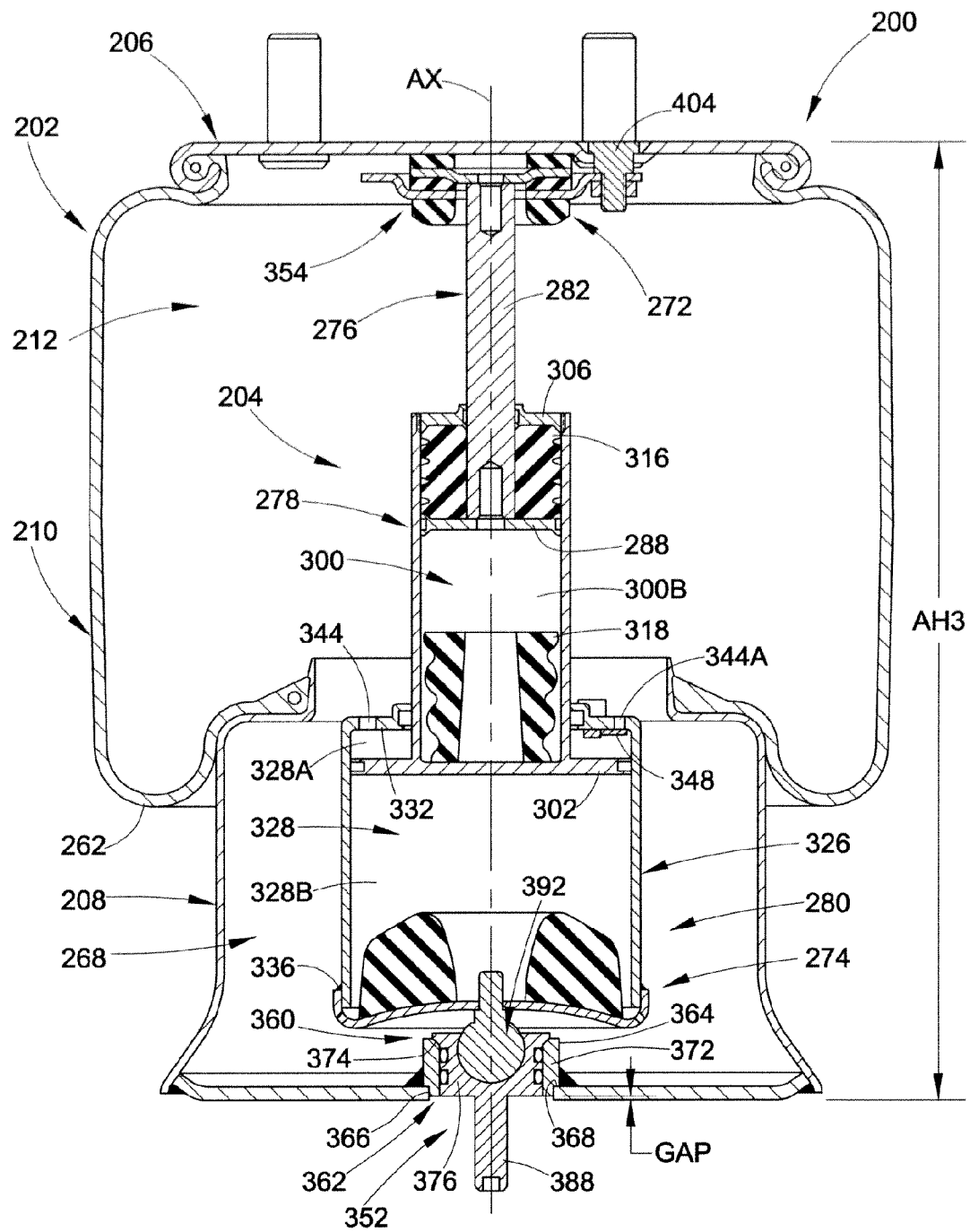
FIG. 6 is a cross-sectional side view of the gas spring and gas damper assembly in FIGS. 2-5 shown in an extended condition.

As gas spring and gas damper assembly 200 is displaced into an extended condition, which may be referred to in the art as a rebound condition, bead plate 206 and piston 208 are moved away one another and may reach an extended height, which is represented in FIG. 6 by reference dimension AH3, that is greater than design height AH1. As bead plate 206 and piston 208 are displaced away from one another, damper rod 282 and damper piston 288 of damper element 276 are also displaced away from piston 208. Initially, the longitudinal forces acting on damper element 276 may be insufficient to further compress biasing element 316, which, due to the direction of displacement, could be compressively loaded during such displacement. As such, biasing element 316 may remain in approximately the same compressive condition and thereby transfer the longitudinal forces acting on damper element 276 into damper element 278. In which case, damper element 278 would compress the pressurized gas contained within chamber portion 328A and urge a portion of the pressurized gas to flow out of the chamber portion through one or more of passages 344 in end wall portion 332 of housing wall 326 and into spring chamber 212. It will be appreciated that valve 348 will cause passage 344A to remain fluidically isolated from chamber portion 328A, under such conditions, such that pressurized gas does not flow out of the chamber portion through passage 344A.

It will be appreciated that pressurized gas within chamber portion 328A is capable of flowing through passages at a given rate depending upon various factors, such as the total orifice area of passages 344, for example. As such, continued extension of assembly 200 can compress the gas within chamber portion 328A and thereby increase the pressure level thereof. This increased pressure level may, at some point, generate a sufficiently-high longitudinal force acting on damper element 276 that results in biasing element 316 being compressed or otherwise deflected, such as is shown in FIG. 6, for example, thereby permitting damper piston 288 to translate along side wall 294 in a direction toward end wall 306.

Additionally, it will be recognized that as assembly 200 is extended, the gas pressure within spring chamber 212 and piston chamber 268 decreases, at least temporarily. At that same time, the gas pressure within chamber portion 328A is increasing, such as has been described above, for example. As a result, an increased differential pressure between the gas within the damping chamber (e.g., chamber portion 328A) and the pressure of the gas into which the gas from the damping chamber flows (e.g., spring chamber 212) may be achieved, which may provide increased damping performance. Additionally, as described above, valve 348 can act as a charging valve that permits an increased volume of pressurized gas to transfer into chamber portion 328A during compression, which can result in an increased overall pressure level within the chamber portion. Upon transitioning to extension, this increased overall pressure level represents the initial pressure level of the pressurized gas within chamber portion 328A as the chamber portion begins to undergo compression, as described above.

Figure 7:
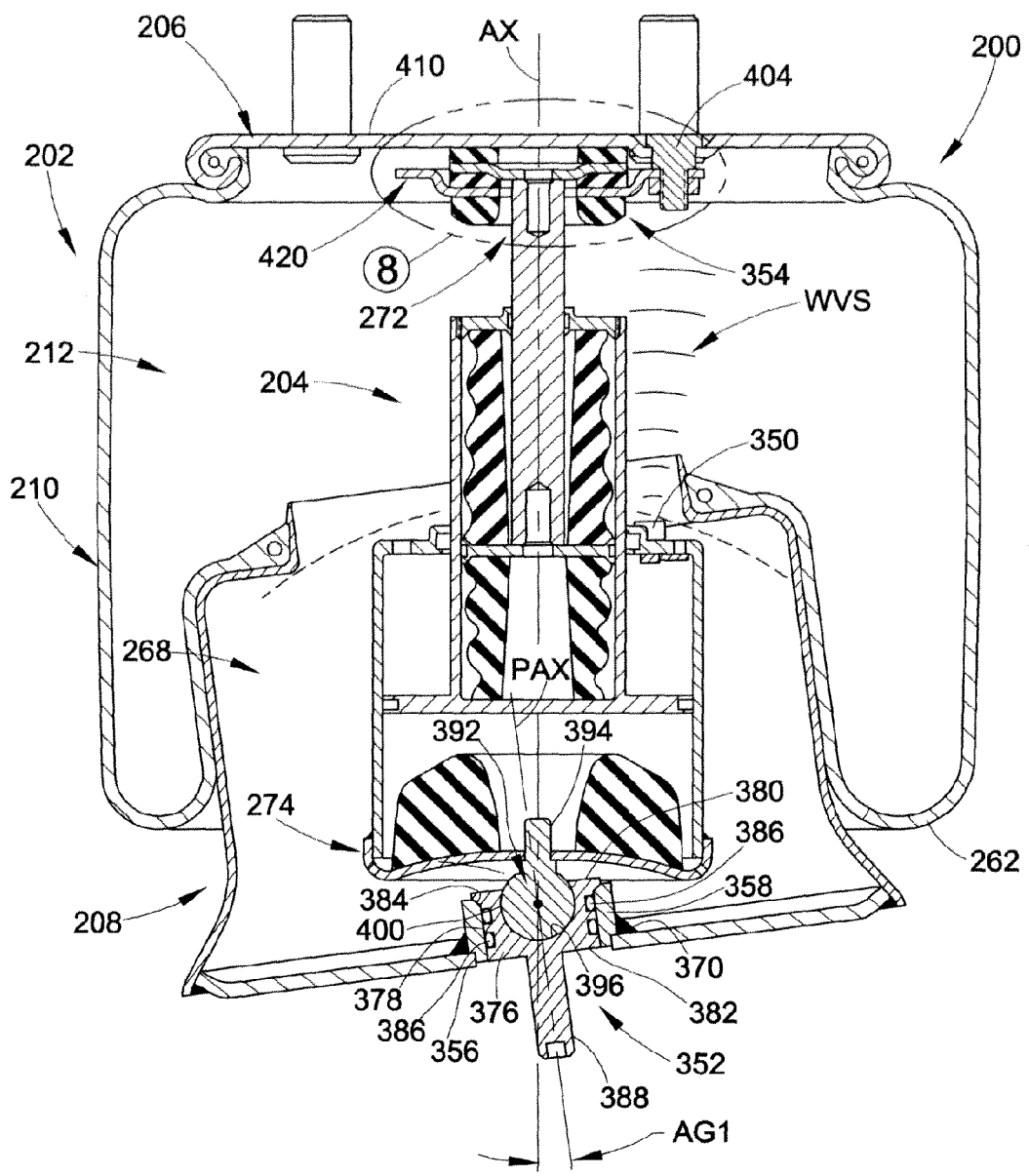
FIG. 7 is a cross-sectional side view of the gas spring and gas damper assembly in FIGS. 2-6 shown undergoing an angular deflection.

Gas spring and gas damper assembly can optionally include any number of one or more additional elements, features and/or components. For example, a distance sensing device can be operatively connected on or along one of the components of the gas spring assembly or the gas damper assembly. As shown in FIGS. 4 and 7, for example, a height sensor 350 can be operatively secured on or along end wall portion 332 of housing wall 326 and can transmit suitable electromagnetic or ultrasonic waves WVS in an approximately longitudinal direction toward bead plate 206. It will be appreciated, however, that other arrangements could alternately be used.

It will be recognized that the foregoing discussion of FIGS. 3-6 regarding the displacement of gas spring and gas damper assembly 200 from a design height to a compressed height and an extended height included movement in a substantially longitudinal direction. In many applications, such as vehicle applications, for example, conventional gas spring assemblies are often displaced such that the first or upper end member (e.g., bead plate 206) and the second or lower end member (e.g., piston 208) are disposed at an angle relative to one another. In some cases, the angle may change (e.g., increase or decrease) as the end members are displaced toward and away from one another. It will be appreciated that conventional gas spring assemblies can typically accommodate such angular misalignments. In some cases, however, the gas spring assembly will include an internally mounted device, such as a rebound limiter or a spring aid, for example, that can limit the amount of angular misalignment that can be accommodated.

Gas spring and gas damper assembly 200 is another example of a gas spring assembly that includes an internally mounted device. In the present case, the internally mounted device takes the form of gas damper assembly 204 that is substantially-entirely contained within gas spring assembly 202. As described above, gas damper assembly 204 extends longitudinally between an end 272 that is operatively connected to bead plate 206 and an end 274 that is operatively connected to piston 208. For the subject matter of the present disclosure to be capable of broad use in a wide variety of applications, it is desirable for gas spring assembly 202 to be capable of operation in applications and operating conditions that can result in relatively high misalignment conditions without interfering with the operation and/or seal integrity of gas damper assembly 204. As such, end 274 of gas damper assembly 204 can be operatively connected with piston 208 by way of a high-articulation misalignment mount 352 that is capable of freely compliant (e.g., non-resilient) articulation, such as is shown in FIGS. 3-7. Additionally, end 272 of gas damper assembly 204 can be operatively connected with bead plate 206 by way of a low-profile misalignment mount 354, such as is shown in FIGS. 3-7. It will be appreciated, however, that mounts 352 and 354 are optional and that either one or both of mounts 352 and 354 can, optionally, be included on or used in connection with gas spring and gas damper assembly 200.

With reference to FIG. 7, gas spring and gas damper assembly 200 is illustrated with bead plate 206 disposed approximately transverse to longitudinal axis AX and with gas damper assembly 204 extending therefrom in a substantially longitudinal direction. Piston 208 is shown as including a piston axis PAX and disposed at an angle relative to longitudinal axis AX, which angle is represented in FIG. 7 by angular reference dimension AG1. Additionally, as described above, piston 208 includes a piston body 230 having a base member 232 that is integrally formed with or otherwise assembled together with an outer shell 234. Regardless of the configuration and/or construction of piston 208 that is used, base member (or base portion) 232 can include an opening wall 356 (FIG. 7) that extends through the base member between inside surface 264 and outside surface 266 such that an opening (not numbered) is formed through the base member. In a preferred arrangement, opening wall 356 and the opening formed thereby are substantially centrally located on or along the base member, such as in substantial alignment with piston axis PAX, for example.

With further reference to FIG. 7, high-articulation misalignment mount 352 includes a mount socket 358 that extends longitudinally along piston axis PAX between an end 360 (FIG. 6) and an end 362 (FIG. 6) that is spaced longitudinally from end 360. Mount socket 358 can be operatively connected on or along base member 232 in any manner suitable for forming a substantially fluid-tight seal with the base member and capable of transferring forces between gas damper assembly 204 and base member 232, such as may occur during use in operation as described above, for example. In the exemplary arrangement identified in FIG. 7, mount socket 358 includes an outer surface 364 (FIG. 6) that has a cross-sectional dimension (e.g., a diameter) that is greater than a cross-sectional dimension (e.g., a diameter) of opening wall 356. Mount socket 358 also includes a portion 366 (FIG. 6) that has a cross-sectional dimension (e.g., a diameter) that is less than the cross-sectional dimension of outer surface 364 and forms a radially-outwardly extending shoulder wall 368 (FIG. 6) along the mount socket, such as along end 362 thereof, for example. Portion 366 can be received within the opening formed by opening wall 356 such that shoulder wall 368 can abuttingly engage inside surface 264 of base member 232. Additionally, mount socket 358 is shown as being secured along base member 232 using a flowed-material joint 370 that forms a substantially fluid-tight seal with the base member. It will be appreciated, however, that other securement arrangements could alternately be used.

Mount socket 358 also includes an inner surface 372 (FIG. 6) that at least partially defines a passage (not numbered) extending through the mount socket. In a preferred arrangement, inner surface 372 (FIG. 6) is substantially cylindrical. Additionally, mount socket 358 can optionally include a load-transmitting feature, such as, for example, may be disposed toward end 360 of the mount socket. In the exemplary embodiment shown in FIGS. 3-7, the load-transmitting feature takes the form of a frustoconical surface 374 (FIG. 6) extending from along the inner surface in a radially outward direction.

High-articulation misalignment mount 352 also includes a mounting member 376 that is received in and supported on mount socket 358. Mounting member 376 includes an outer surface 378, which is dimensioned to be received within the passage formed by inner surface 372 and extending through mount socket 358. Mounting member 376 also includes an end surface 380 and an opposing end surface 382. Additionally, a load-transmitting feature, such as a surface 384, for example, can extend in a radially-outward direction, such as from along outer surface 378. In a preferred arrangement, the load-transmitting feature of the mounting member is complimentary to the load-transmitting feature provided along mount socket 358. For example, in the arrangement shown in FIGS. 3-7, surface 384 can have a frustoconical shape with approximately the same included angle (not numbered) as frustoconical surface 374.

It will be recognized that high-articulation misalignment mount 352 utilizes a passage extending through the substantially fluid-tight envelope of the gas spring assembly. As such, high-articulation misalignment mount 352 preferably includes one or more sealing elements that form and maintain a substantially fluid-tight seal therealong to prevent or at least minimize pressurized gas loss through the high-articulation misalignment mount. For example, one or more sealing elements, such as sealing elements 386, for example, can be disposed between mount socket 358 and mounting member 376 such that a substantially fluid-tight seal is formed therebetween. In the exemplary arrangement shown in FIGS. 3-7, a plurality of sealing elements 386 are spaced longitudinally from one another and are at least partially received within grooves (not numbered) formed into the mounting member. It will be appreciated, however, that other arrangements could alternately be used.

A mounting stud 388 projects axially-outwardly from along end surface 382 of mounting member 376 and can include a plurality of threads suitable for receiving a corresponding securement device, such as a threaded nut 390 (FIG. 3), for example. Alternately, a threaded passage (not shown) could extend into the mounting member and could receive a corresponding securement device, such as a threaded fastener, for example. As shown in FIG. 3, mounting stud 388 is operatively connected along lower structural component LSC using threaded nut 390. Mounting member 376 is preferably dimensioned such that upon securement of the mounting member in such a manner, one load-transmitting feature (e.g., surface 384) of the mounting member will abuttingly engage the corresponding load-transmitting feature (e.g., surface 374) of the mount socket. To ensure such abutting engagement, mounting member 376 is preferably dimensioned such that end surface 382 remains spaced longitudinally-inwardly from outer surface 266 of base member 232 and such that a gap, which is represented in FIG. 6 by reference dimension GAP, is formed and maintained between end surface 382 and outer surface 266 of base member 232.

High-articulation misalignment mount 352 also includes a joint end 392 that is operatively connected to mounting member 376 and is capable of undergoing angular displacement relative thereto. In a preferred arrangement, joint end 392 will be capable of undergoing an angular deflection of up to at least approximately 20 degrees and can, optionally, rotate, swivel or otherwise accommodate such angular deflection over 360 degrees of rotation. It will be appreciated, however, that other arrangements could alternately be used.

Joint end 392 can include a mounting stud 394 (FIG. 5) that is adapted for securement on, along or otherwise to a device mounted internally to the gas spring assembly (e.g., gas damper assembly 204). In the present exemplary embodiment, mounting stud 394 threadably engages and is, thus, secured to end wall 324 of damper element 280. It will be appreciated, however, that other securement arrangements could alternately be used. Additionally, joint end 392 includes a spherical joint surface 396 (FIG. 5) that is disposed generally opposite mounting stud 394 and includes a centerpoint or pivot CP1 (FIG. 5). A side wall 398 (FIG. 5) can extend between mounting stud 394 and spherical joint surface 396 and can include a plurality of flats (not shown) or other engagement features for threadably attaching or otherwise securing joint end 392 to the internally mounted device (e.g., gas damper assembly 204).

As identified in FIG. 7, mounting member 376 includes a corresponding spherical joint surface 400 that at least partially forms a spherical joint recess (not numbered) extending into the mounting member from along end surface 380. Spherical joint surface 400 is complimentary to spherical joint surface 396 of joint end 392 such that the joint end can undergo angular deflection about centerpoint or pivot CP1 (FIG. 5), such as in the manner described above.

Figure 8:
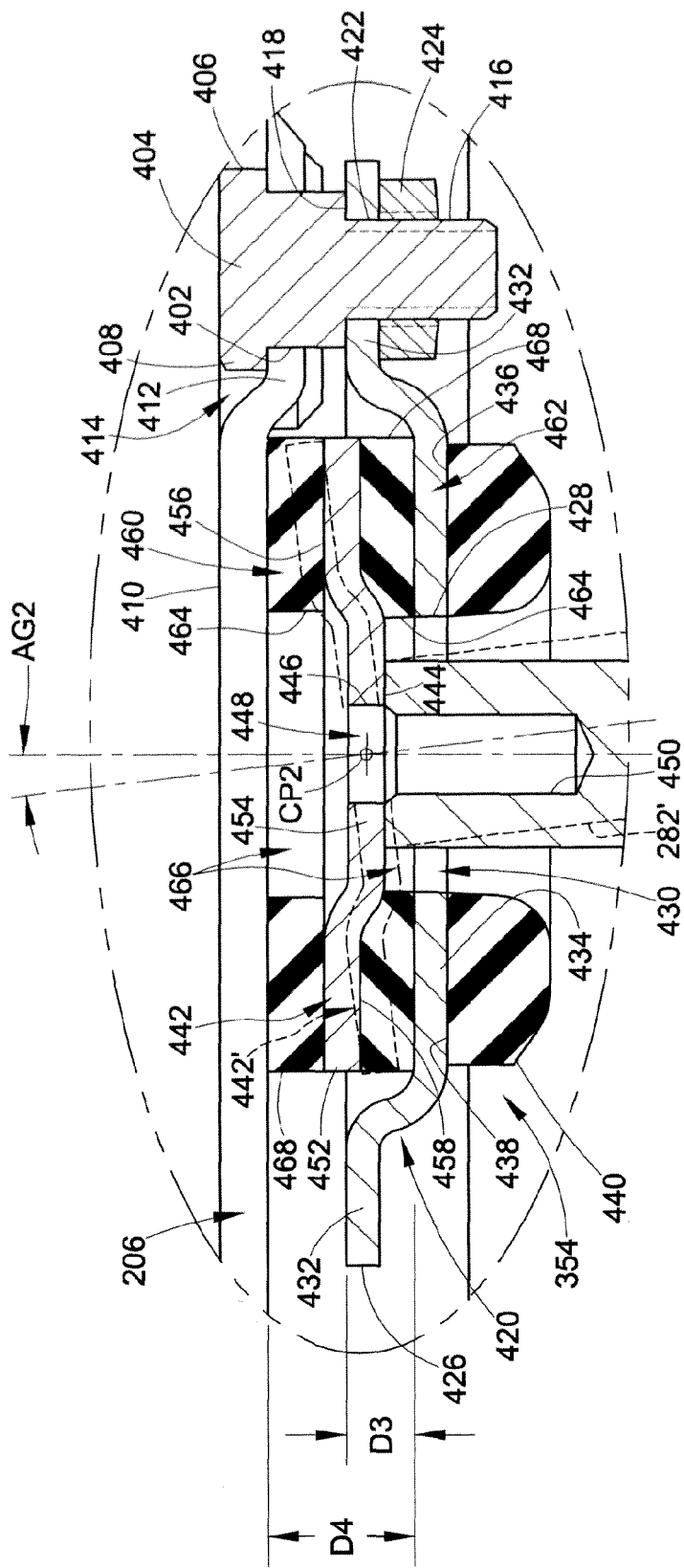
FIG. 8 is an enlarged, cross-sectional side view of the portion of the gas spring and gas damper assembly in FIGS. 2-7 identified as Detail 8 in FIG. 7 and shown undergoing an angular deflection.

With reference now to FIGS. 7 and 8, low-profile misalignment mount 354 is shown as being operatively connected between and end member of a gas spring assembly and an end of an internally mounted device, and is capable of resilient angular deflection that urges at least a portion of the internally mounted device toward a neutral orientation, such as an orientation that is approximately aligned with axis AX. In the exemplary arrangement shown, low-profile misalignment mount 354 is secured between bead plate 206 of gas spring assembly 202 and end 272 of gas damper assembly. It will be appreciated, however, that the arrangement shown and described herein is merely one example of a suitable arrangement and that low-profile misalignment mount 354 could be used in operative association with a wide variety of other components and/or assemblies without departing from the subject matter of the present disclosure.

An end member or other component of a gas spring assembly can include one or more features for securement of mount 354 thereto. For example, bead plate 206 can include an opening wall 402 that at least partially defines a hole or opening (not numbered) extending through the bead plate. A securement device, such as a threaded mounting stud 404 can extend through the opening such that at least a portion of the mounting stud is in fluid communication with spring chamber 212. It will be appreciated that a substantially fluid-tight seal is preferably formed between bead plate 206 and mounting stud 404 in a suitable manner. For example, a flowed-material joint or seal (not shown) can be formed between the components. Additionally, or in the alternative, mounting stud 404 can include an outer side wall 406 that is dimensioned to form a press-fit connection with opening wall 402. Upon forcing mounting stud 404 into the opening formed by opening wall 402, a substantially fluid-tight seal can be formed between outer side wall 406 and opening wall 402.

Mounting stud 404 can include a head 408 that has a thickness (not identified). In some cases, it may be desirable to prevent head 408 from projecting beyond an outer surface 410 of bead plate 206. In which case, a portion 412 of bead plate 206 can, optionally, be deflected in a longitudinally-inward direction such that a recess 414 is formed along the exterior of the bead plate for receiving head 406 of mounting stud 404.

Mounting stud 404 can include a threaded portion 416 that projects longitudinally-outwardly from a shoulder wall 418 that extends radially-inwardly from along outer side wall 406. In some cases, a plurality of mounting studs 404 can be used and may be disposed in a suitable pattern or configuration on or along bead plate or other end member of the gas spring assembly. As shown in FIG. 2, three mounting studs 404 are disposed circumferentially about axis AX. It will be appreciated, however, that any other suitable number and/or configuration of mounting studs could alternately be used.

Low-profile misalignment mount 354 also includes a retainer plate 420 that is disposed within the spring chamber of the gas spring assembly. Retainer plate 420 can be of any suitable size, shape and/or configuration. In the exemplary arrangement shown, retainer plate 420 includes a plurality of opening walls 422 each forming an opening (only one of which is shown) extending through the retainer plate. Opening walls 422 and the corresponding opening formed by each thereof are disposed in a pattern or arrangement that is complimentary to the arrangement of mounting studs 404 such that the retainer plate can be received on and secured to mounting studs 404 in a suitable manner, such as through the use of a threaded nut 424, for example. Outer periphery 426 of retainer plate 420 can be of any suitable size, shape and/or configuration, such as being of a circular shape, for example. In the exemplary embodiment illustrated in FIG. 3, for example, outer periphery 426 has an approximately triangular shape.

Retaining plate 420 is also shown as including an inner side wall 428 that at least partially defines a central passage 430 extending through the retaining plate. Additionally, retaining plate 420 can, optionally, include one or more outer wall portions 432 through which opening walls 422 extend, and can, optionally, include an offset portion 434 that is disposed radially-inwardly from outer wall portions 432 and is spaced longitudinally therefrom. Retaining plate 420 is supported along mounting studs 404 such that outer wall portions 432 are disposed a first distance from bead plate 206, which distance is represented in FIG. 8 by reference dimension D3. And, retaining plate 420 is oriented such that offset portion 434 is disposed a second distance from bead plate 206, which distance is represented in FIG. 8 by reference dimension D4, that is greater than the first distance.

Additionally, retaining plate 420 includes a surface 436 and an opposing surface 438. In the arrangement shown in FIGS. 2-8, retaining plate is oriented such that surface 436 is facing toward bead plate 206 and surface 438 is facing away from bead plate 206. Low-profile misalignment mount 354 can also, optionally, include a bumper 440 that is disposed along surface 438 and can be secured thereto in a suitable manner, such as through the use of an adhesive connection, for example.

Low-profile misalignment mount 354 further includes an end plate 442 that is adapted for securement on or along a feature or component of the associated internal device that is connected between the opposing end members of the gas spring assembly within the spring chamber thereof. In the present case, gas damper assembly 204 represents the associated internal device. As such, end 284 of damper element 276 is operatively connected to mount 354, such as by securing end plate 442 on or along an end wall 444 of damper rod 282. As one example, end plate 442 can include an opening wall 446 that at least partially defines an opening 448 extending through the end plate. A securement feature, such as a threaded hole 450, for example, can be provided along end wall 444 of damper rod 282 and a suitable securement device, such as a threaded fastener (not shown), for example, can attached the end plate and damper rod to one another.

In the exemplary arrangement shown in FIGS. 3 and 5-8, end plate 442 includes an outer wall portion 452 and an offset wall portion 454 that is disposed radially-inwardly from outer wall portion 452 and spaced longitudinally therefrom, such as in the manner described in connection with the configuration of retaining plate 420, for example. It will be appreciated that end plate 442 extends radially-outwardly from along damper rod 282 in a direction generally transverse to longitudinal axis AX.

End plate 442 also includes a surface 456 and an opposing surface 458. End plate 442 is oriented such that surface 456 is facing toward bead plate 206 and such that surface 458 is facing toward surface 436 of retaining plate 420. Low-profile misalignment mount 354 includes bushing elements 460 and 462 disposed on opposing sides of end plate 442. In the exemplary embodiment shown, bushing element 460 is disposed between bead plate 206 and surface 456 of end plate 442, and bushing element 462 is disposed between surface 436 of retaining plate 420 and surface 458 of end plate 442. Bushing elements 460 and 462 can be of any suitable shape and/or configuration, such as including an inner side wall 464 that at least partially defines an opening 466 extending therethrough and an outer side wall 468 that at least partially defines an outer periphery of the bushing elements.

Bushing elements 460 and 462 are preferably formed from an elastomeric material, such as a rubber material (e.g., synthetic or natural rubber) or a thermoplastic elastomer (e.g., a polyurethane-based material), that will permit the bushing elements to deform as the end member of the gas spring assembly (e.g., bead plate 206) and the associated internal device (e.g., damper rod 282 of gas damper assembly 204) undergo angular displacement relative to one another, such as is represented by dashed lines 282' in FIG. 8. As is represented by dashed lines 442', it will be appreciated that end plate 442 will move relative to bead plate 206 and together with damper rod 282 due to the substantially rigid connection therebetween. As such, end plate 442 will urge bushing elements 460 and 462 to deform and, depending upon the materials and/or thickness of the bushing elements, at least some deformation will be permitted thereby. It will be appreciated that such relative movement may involve angular deflection about a centerpoint or pivot CP2 (FIG. 8), such as is represented in FIG. 8 by angular reference dimension AG2.

Figure 9:
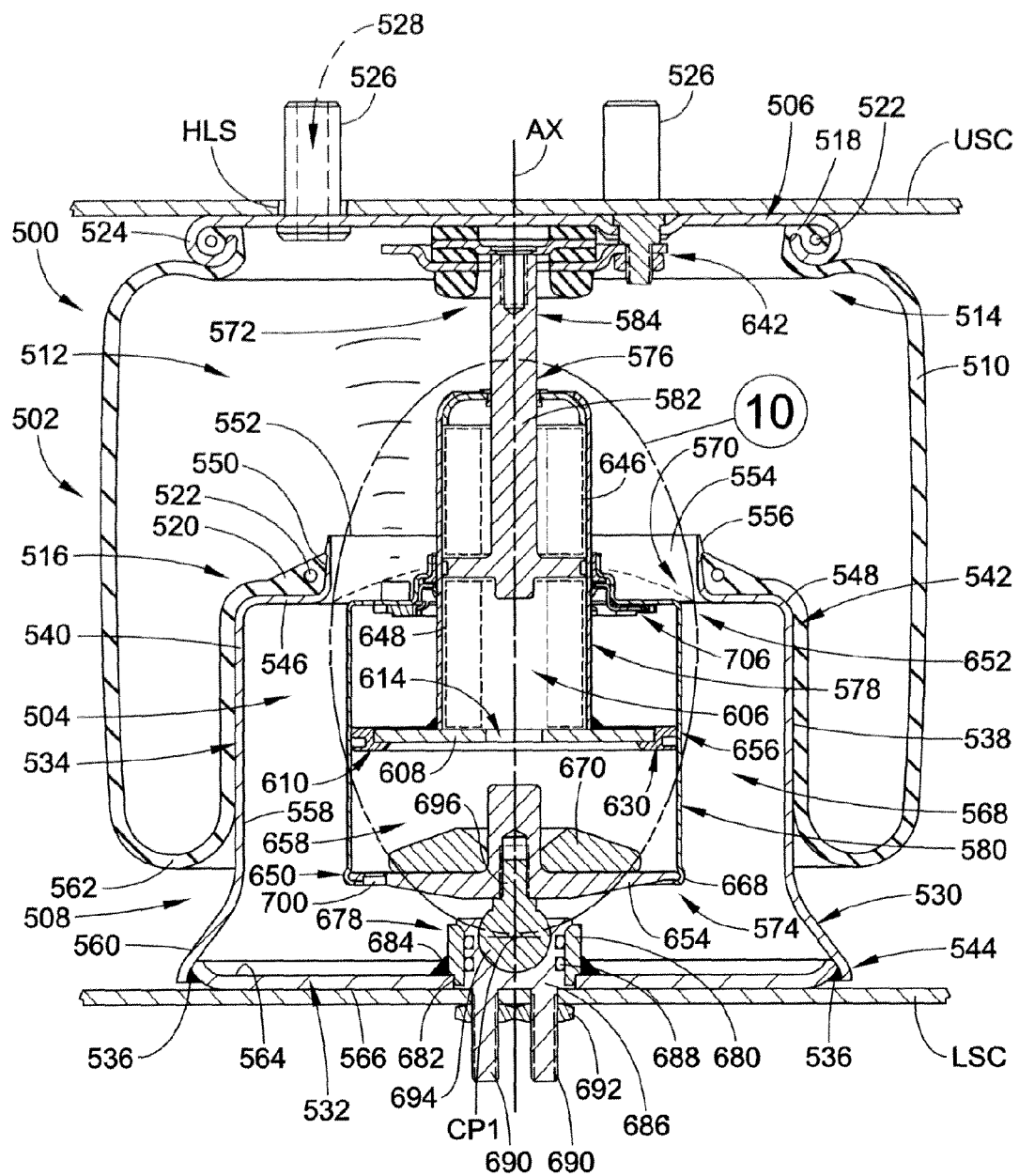
FIG. 9 is a cross-sectional side view of another example of a gas spring and gas damper assembly in accordance with the subject matter of the present disclosure.

Another example of a gas spring and gas damper assembly 500 in accordance with the subject matter of the present disclosure is shown in FIGS. 9-14, such as may be used as gas spring and gas damper assemblies 110 in FIG. 1, for example. Gas spring and gas damper assembly 500 includes a gas spring assembly 502 and a gas damper assembly 504 that is substantially-entirely housed within the gas spring assembly. Gas spring assembly 502 can be of any type, kind, construction, configuration and/or arrangement, such as is shown in FIG. 9 as being of a rolling lobe-type construction, for example, and can have a longitudinal axis and can include a first end member, an opposing second end member spaced longitudinally from the first end member and a flexible wall that is operatively connected therebetween. It will be appreciated, however, that other gas spring assembly constructions could alternately be used, such as a convoluted bellow-type construction, for example. Additionally, gas spring assembly 502 can be operatively connected between opposing structural components in any suitable manner, such as, for example, are generally represented in FIG. 9 by upper structural component USC (e.g., vehicle body 102 in FIG. 1) and lower structural component LSC (e.g., axle 104 in FIG. 1).

In the exemplary arrangement shown in FIGS. 9-14, gas spring assembly 502 has a longitudinally-extending axis AX and includes a first or upper end member, such as a bead plate 506, for example, and an opposing second or lower end member, such as a piston 508, for example, that is spaced longitudinally from the first end member. A flexible wall, such as a flexible sleeve 510, for example, can be secured between the first end member (e.g., bead plate 506) and the second end member (e.g., piston 508) in a suitable manner such that a spring chamber 512 is at least partially formed therebetween.

Flexible sleeve 510 extends in a generally longitudinal manner between a sleeve end 514 and a sleeve end 516. Flexible sleeve 510 includes a mounting bead 518 along sleeve end 514 and a mounting bead 520 along sleeve end 516. Mounting beads 518 and 520 can optionally include a reinforcing element or other suitable component, such as a bead wire 522, for example.

End 514 of flexible sleeve 510 can be secured on or along the end member in any suitable manner. For example, mounting bead 518 of the flexible sleeve can be captured by an outer peripheral edge 524 of bead plate 506. The peripheral edge can be deformed around mounting bead 218 in any manner suitable for forming a substantially fluid-tight seal therewith. One or more securement devices, such as mounting studs 526, for example, can be included along bead plate 506 and project through the associated structural component (e.g., upper structural component USC) in a manner suitable for receiving a corresponding securement device or element, such as a threaded nut (not shown), for example, to secure the first end member to the associated structural component. In the exemplary embodiment shown in FIG. 3, mounting studs 526 project axially outwardly from the bead plate and extend through holes HLS in upper structural component USC.

Additionally, a fluid communication port, such as a fluid passage 528, for example, can optionally be provided on or along the first or upper end member to permit fluid communication with spring chamber 512. In the exemplary embodiment shown, fluid passages 528 extend through mounting studs 526 and are in fluid communication with the spring chamber. It will be appreciated, however, that any other suitable fluid communication arrangement could alternately be used.

Mounting bead 520 of flexible sleeve 510 can be secured to the second end member in any suitable manner. As one example, the mounting bead could be retained on or along the piston using one or more retaining elements or components (e.g., crimp rings or retaining caps). As another example, mounting bead 520 could be friction fit along a wall portion of piston 508 and, optionally, at least partially retained thereon using a radially outwardly-extending projection. It will be appreciated, however, that any other suitable arrangement and/or configuration could alternately be used.

In the exemplary embodiment in FIGS. 9-14, for example, piston 508 is shown as including piston body 530 that is formed from a base member 532 and an outer shell 534, which is operatively connected to the base member such that a substantially fluid-tight seal is formed therebetween, such as through the use of a flowed-material joint 536 extending circumferentially about axis AX, for example. It will be appreciated, however, that in other cases, a piston body could be used in which the base member and outer shell are integrally formed with one another, such as through the use of an injection molding process, for example. In such case, the base member could be alternately referred to as a base portion or base member portion, and the outer shell could be alternately referred to as an outer shell portion.

Outer shell (or outer shell portion) 534 includes a shell wall 538 that extends circumferentially about axis AX. Shell wall 538 includes an outer side wall portion 540 that extends in a generally longitudinal direction between an end 542, which is disposed toward bead plate 506, and an end 544, which is disposed in longitudinally spaced relation to end 542 and toward lower structural component LSC. Shell wall 538 also includes an end wall portion 546 that transitions into outer side wall portion 540 at a curved or shoulder portion 548. An inner side wall portion 550 projects from end wall portion 546 in a direction extending axially away from end 544. Inner side wall portion 550 terminates in the axial direction at an end 552. Additionally, inner side wall portion 550 includes an outer surface (not numbered) facing radially outward and an inner surface 554 facing radially inward. A projection 556 extends radially-outwardly from along the outer surface adjacent end 552 of inner side wall portion 550.

It will be recognized that a wide variety of shapes, profiles and/or configurations can and have been used in forming the outer side wall of a gas spring piston. As such, it will be appreciated that outer side wall portion 540 of shell wall 538 can be of any suitable shape, profile and/or configuration and that the profile shown in FIGS. 2-7 is merely exemplary. Mounting bead 520 of flexible sleeve 510 can be received on or along the outer surface of inner side wall portion 550 such that a substantially fluid-tight seal is formed therebetween with projection 556 at least partially retaining mounting bead 520 on inner side wall portion 550. Additionally, outer side wall portion 540 of shell wall 538 includes an inside surface 558 and an outside surface 560. As such, a portion of flexible sleeve 510 extends along end wall portion 546 and outside surface 560 of outer side wall portion 540 such that a rolling lobe 562 is formed along piston body 530 and is displaced along the outer side wall portion as the gas spring assembly undergoes changes in overall height.

Base member 532 includes an inside surface 564 and an outside surface 566, which can be disposed in abutting engagement with lower structural component LSC. Inside surface 564 of base member 532 and inside surface 558 of outer side wall portion 540 at least partially define a piston chamber 568 within piston 508. Inner surface 554 of inner side wall portion 550 at least partially defines an opening or passage 570 into piston 508 by which piston chamber 568 is in fluid communication with spring chamber 512. In a preferred arrangement, inner surface 554 defines an opening or passage (e.g., passage 570) into piston chamber 568 that is of sufficient size to permit piston chamber 568 and spring chamber 512 to operate as a substantially unified fluid chamber. That is, in a preferred arrangement, passage 570 will be sufficiently large that minimal fluid flow restriction (e.g., approximately zero fluid flow restriction) will occur for pressurized gas flowing between spring chamber 512 and piston chamber 568 under typical conditions of operation.

Gas damper assembly 504 is shown in FIGS. 9-14 as being substantially entirely contained within gas spring assembly 502 and extending longitudinally between an end 572 that is operatively connected to bead plate 506 and an end 574 that is operatively connected to piston 508. Gas damper assembly 504 includes a plurality of damper elements that are operatively interconnected with one another for telescopic extension and compression in relation to corresponding extension and compression of gas spring assembly 502.

In the exemplary arrangement in FIGS. 9-14, gas damper assembly 504 is shown as including damper elements 576, 578 and 580 that are operatively interconnected with one another for telescopic extension and compression. Damper element 576 is operatively connected to the first end member (e.g., bead plate 506) and extends from the first end member toward the second end member (e.g., piston 508). Damper element 580 is operatively connected to the second end member (e.g. piston 508) and extends from the second end member toward the first end member (e.g., bead plate 506). Damper element 578 is disposed longitudinally between damper elements 576 and 580, and is operatively interconnected therewith such that damper elements 576 and 578 can move relative to one another and such that damper element 578 and 580 can move relative to one another.

Figure 10:
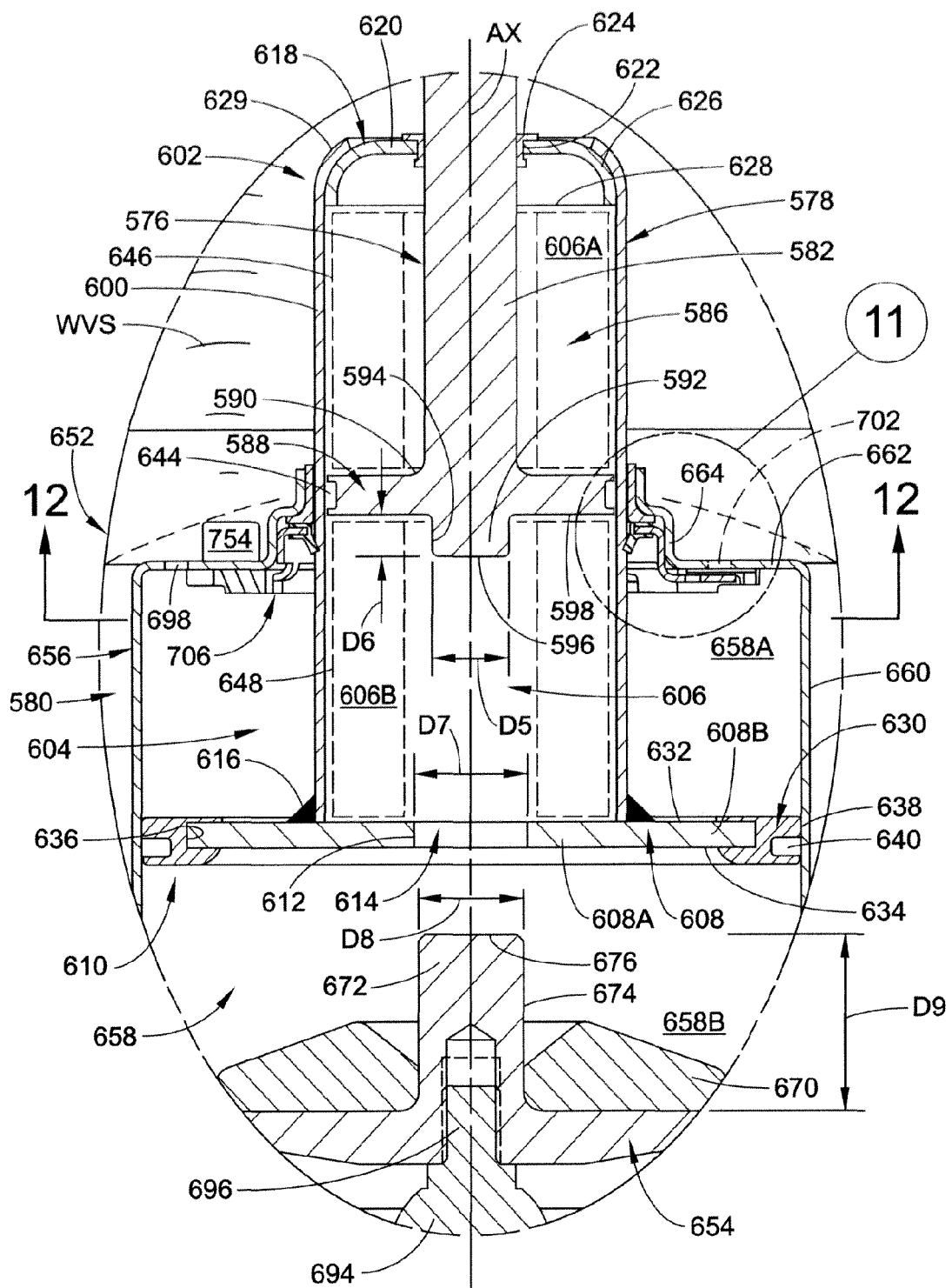
FIG. 10 is an enlarged, cross-sectional view of the portion of the gas spring and gas damper assembly identified as Detail 10 in FIG. 9.

As shown in FIG. 10, damper element 576 includes a damper rod 582 that extends longitudinally from an end 584 (FIG. 9) to an end 586. A damper piston 588 is disposed along end 586 of damper rod 582 and can be attached or otherwise connected thereto in any suitable manner. For example, in a one arrangement, damper piston 588 is integrally formed with damper rod 582 from a unitary mass of material (e.g., metal material, such as steel or aluminum, for example). In such case, a fillet 590 having a generous radius can be formed between damper rod 582 and damper piston 588. Such an arrangement can provide an improved stress distribution and force transfer to, from and between the damper rod and the damper piston.

Additionally, damper element 576 can, optionally, include a piston stop 592 that projects axially outwardly beyond damper piston 588 in a direction opposite damper rod 582. Piston stop 592 is at least partially defined by an outer side wall 594 and an end wall 596. Outer side wall 594 can be of any suitable shape and/or configuration, such as cylindrical, for example. And, outer side wall 594 can be of any suitable cross-sectional size or dimension, such as is represented in FIG. 10 by reference dimension D5. Outer side wall 594 can extend outwardly in a direction away from an outer side surface 598 of damper piston 588 such that end wall 596 is spaced away from outer side surface 598 by a predetermined distance, such as is represented in FIG. 10 by reference dimension D6.

It will be appreciated that, if formed from a unitary mass of material, damper element 576 can be manufactured or otherwise produced in any suitable manner and/or through the use of any suitable processes. For example, damper element 576 could be formed from a unitary mass of steel material through the use of a cold-heading process. Alternately, other materials and/or processes could be used, such as impact extrusion and/or hot forging processes. Additional features, such as rod mounting threads, rod seal elements, wear-band glands, anti-rotation features and/or drive features, such as non-circular (e.g., hex-shaped) male and/or female drive features, for example, can optionally be included. Material treatments and/or coatings can also be included on or along one or more portions of the damper elements (e.g., damper elements 576, 578 and/or 580).

Damper element 578 includes a side wall 600 extending circumferentially about axis AX between longitudinally-spaced ends 602 and 604 such that a longitudinally-extending damping chamber 606 is at least partially formed by side wall 600. A piston base wall 608 is disposed along end 604 of damper element 578. In some cases, a portion 608A of piston base wall 608 can, optionally, extend across an open end (not numbered) of side wall 600 to at least partially define damping chamber 606, such as is shown in FIGS. 9 and 10, for example. A piston passage wall 612 can at least partially define a piston passage 614 that extends through portion 608A of piston base wall 608. It will be appreciated that piston passage 614 can be of any suitable size, shape and/or configuration, such as may be suitable for permitting fluid transfer into and out of damping chamber 606. Piston passage 614 is shown in FIG. 10 as having a cross-sectional size or dimension, as is represented by reference dimension D7. In a preferred arrangement, piston passage 614 is of sufficient size to permit complimentary components and/or features, such as piston stop 592, for example, to fit into and out of the piston passage and thereby extend through piston base wall 608.

Another portion 608B of piston base wall 608 can extend radially-outwardly beyond side wall 600 to at least partially form a damper piston 610 along end 604 of damper element 578. It will be appreciated that piston base wall 608 can be secured on or along side wall 600 in any suitable manner, such as through the use of a flowed-material joint 616, for example. In a preferred arrangement, a substantially fluid-tight connection can be formed between the side wall and the piston base wall.

Damper element 578 can also include an end cap 618 that is disposed along end 602 and extends across an open end (not numbered) of side wall 600 to thereby further enclose and define damping chamber 606. End cap 618 is shown as including an end wall portion 620 with a passage wall 622 that at least partially defines a rod passage (not numbered) extending through the end wall. A bearing element and/or sealing element can, optionally, be included within or otherwise along the rod passage for abuttingly engaging damper rod 582 of damper element 576. In the exemplary arrangement shown in FIGS. 9 and 10, a bushing 624 is disposed within the rod passage and secured along end wall portion 620. End cap 618 also includes an outer peripheral wall portion 626 that terminates at a distal edge 628. In the exemplary arrangement shown in FIGS. 9 and 10, outer peripheral wall portion 626 has a curved cross-sectional profile. It will be appreciated, however, that other profiles and/or configurations could alternately be used.

In some cases, end cap 618 can be formed as a metal stamping, such as a stamped steel or aluminum construction, for example. Additionally, side wall 600 can be formed from a malleable metal material, such as steel or aluminum, for example. In such case, a retaining portion 629 of side wall 600 can be deformed radially-inwardly to abuttingly engage or otherwise at least partially conform with outer peripheral wall portion 626 of end cap 618 to thereby retain the end cap within the open end of the side wall. Alternately, a flange could be formed along the open end of the side wall, and the end cap could be crimped or otherwise formed outwardly over the flange for securement to the side wall.

It has been recognized that conventional piston-cylinder arrangements often include a piston having a sealing element to reduce fluid transfer from one side of the piston to the other and a bearing to support radial loads. Known designs can result in increased thickness of the piston, which can, in some cases, limit the available stroke of such known piston-cylinder arrangements. Additionally, endless grooves, which are sometimes referred to as glands, are often included to receive and retain one or more sealing elements and/or radial bearings, such as wear bands, for example. In conventional constructions, pistons are often formed from a material having a relatively high strength, such as metal (e.g., steel or aluminum), for example, to withstand the axial and/or radial loads associated with the operation and use of the piston-cylinder arrangement. In such cases, the grooves (or glands) are often machined or otherwise formed into the piston, which can undesirably result in increased costs and/or time associated with manufacturing as well as other factors, such as increased material mass to accommodate such features, for example.

As such, damper piston 610 of damper element 578 can also include an outer piston wall 630 that can be operatively connected to piston base wall 608 in any suitable manner. In the exemplary arrangement shown in FIGS. 9 and 10, piston base wall 608 has opposing side surfaces 632 and 634, and terminates at an outer edge wall 636. Outer piston wall 630 extends radially-outwardly beyond outer edge wall 636 and thereby forms an outermost edge 638 of damper piston 610. Outer piston wall 630 extends axially-outwardly beyond side surfaces 632 and 634, and extends radially inwardly along the side surfaces to abuttingly engage the side surfaces for retainment of outer piston wall 630 on and along piston base wall 608 to thereby form damper piston 610. One or more grooves or other features can also be formed on or along the outer piston wall. For example, a radially-inwardly extending groove 640, such as may be suitable for receiving a sealing element (not shown) and/or a bearing element (not shown), for example, is shown extending endlessly around the outer piston wall along outermost edge 638. It will be appreciated, however, that other arrangements and/or configurations could alternately be used.

The aforementioned construction of damper piston 610 can assist in minimizing overall piston thickness, and may thereby increase stroke and/or strength and/or may reduce mass and/or manufacturing costs. As can be observed from FIG. 10, a comparably thinner piston base wall can be used as a result of including the outer piston wall, which can function as a bearing and/or wear ring as well as incorporate the seal gland for receiving and retaining a sealing element. It will be appreciated that outer piston wall 630 can be secured on or along piston base wall 608 in any suitable manner. As one example, the outer piston wall could be formed by injection molding the outer piston wall over the piston base wall. Alternately, the outer piston wall could be formed as one or more components that are secured to the piston base wall in a suitable manner, such as through the use of a flowed-material joint, fasteners and/or snap features, for example. Furthermore, outer piston wall 630 can be formed from any suitable material or combination of materials. As one example, the outer piston wall can be formed from or otherwise include a polymeric material, such as nylon, for example, that includes a dry lubricant, such as molybdenum disulfide, for example.

As discussed above, damper elements 576 and 578 are operatively interengaged with one another for telescopic extension and compression. In the exemplary arrangement shown, damper piston 588 is disposed within damping chamber 606 and damper rod 582 extends out of damping chamber 606 through the rod passage (not numbered) that is at least partially defined by passage wall 622. As such, end 584 of damper rod 582 is disposed outwardly of damping chamber 606 and can be operatively connected along bead plate 506 in a suitable manner, such as through the use of a misalignment mount 642, for example, as is shown in FIG. 9. It will be appreciated that the construction, operation and interconnection of misalignment mount 642 with bead plate 506 and damper rod 582 of gas damper assembly 504 can be substantially identical to the function, operation and interconnection of misalignment mount 354 with bead plate 206 and damper rod 282 of gas damper assembly 204, such as has been described in detail above in connection with FIGS. 3-7. For purposes of brevity and ease of reading, full detailed descriptions of misalignment mount 642 is not repeated here. However, it is to be distinctly understood that the foregoing description of misalignment mount 354 as well as the operation and interconnection thereof with bead plate 206 and damper rod 282 is equally applicable to misalignment mount 642, bead plate 506 and damper rod 582.

Damping chamber 606 is separated by damper piston 588 into chamber portions 606A and 606B. In some cases, it may be desirable to maintain chamber portions 606A and 606B in fluidic isolation from one another, such as by including one or more sealing elements (not shown) operatively disposed between damper piston 588 and side wall 600. Additionally, it may be desirable to include one or more sealing elements (not shown) and/or bearing elements (e.g., bushing 624) between damper rod 582 and passage wall 622 such that a substantially fluid-tight seal and/or wear-resistant interface can be formed therebetween. Furthermore, such a sealing element, if provided, could assist in maintaining damping chamber 606 and spring chamber 512 in fluidic isolation with one another, at least through the rod passage. In such case, additional fluid communication ports (not shown) can be selectively provided in one or more of damper piston 588, end cap 618 and/or a portion 608A of piston base wall 608 (e.g., piston passage 614). Such additional fluid communication ports can be sized and configured to generate damping forces during relative movement between damper element 576 and damper element 578.

It will be recognized that significant frictional forces may be generated by any sealing arrangements, if provided, that have been described above in connection with the interface between damper piston 588 and side wall 600 as well as in connection with the interface between damper rod 582 and passage wall 622. In some cases, it may be desirable to avoid these frictional forces (or for other reasons) by forgoing the use of sealing elements along the interface between damper piston 588 and side wall 600 and/or along the interface between damper rod 582 and passage wall 622. In such case, a friction reducing bushing or wear band can, optionally, be disposed between the damper piston and the side wall and/or between the damper rod and the passage wall. As identified in FIG. 10, friction-reducing bushings or wear bands 624 and 644 are respectively disposed between damper rod 582 and passage wall 622 and between damper piston 588 and side wall 600.

Gas damper assembly 504 can also include at least one biasing element disposed within damping chamber 606 and can be operative to act between damper piston 588 and end cap 618 and/or portion 608A of piston base wall 608. In the exemplary arrangement shown in FIGS. 9-11, two biasing elements are included. Biasing element 646 is disposed within chamber portion 606A and is operative to act on and between damper piston 588 and end cap 618. Biasing element 648 is disposed within chamber portion 606B and is operative to act on and between damper piston 588 and portion 608A of piston base wall 608. One benefit of including a biasing element, such as biasing element 646 and/or 648, for example, within one or both of the chamber portions (e.g., chamber portions 606A and 606B) is that the biasing element can act as a bumper or cushion that impedes direct physical contact between damper piston 588 and a corresponding one of end cap 618 and/or portion 608A of piston base wall 608.

Another benefit of including a biasing element, such as biasing element 646 and/or 648, for example, within one or both of the chamber portions (e.g., chamber portions 606A and 606B) is that the biasing element(s) can act to establish and/or control the longitudinal position of damper element 578 relative to other components of the gas damper assembly, such as has been discussed in detail above in connection with damper elements 276 and 278. Additionally, during operation, the longitudinal forces acting between damper element 576 and damper element 578 will deflect biasing elements 646 and 648 in various manners, such as has been discussed in detail above in connection with damper elements 276 and 278. It will be appreciated that a biasing force threshold will correspond with or otherwise have a relation to the spring rate of the one or more biasing elements (e.g., biasing elements 646 and/or 648). As such, it will be recognized that where two biasing elements are used, such as biasing elements 646 and 648, for example, the biasing elements could have different spring rates, such as, for example, by using different materials or combinations of materials for the biasing elements and/or by using different sizes, dimensions and/or proportions for the biasing elements.

For purposes of brevity and ease of reading, full detailed descriptions of the use and operation of biasing elements 646 and 648 with respect to the relative positioning and movements of damper elements 576 and 578 are not repeated here. However, it is to be distinctly understood that the foregoing descriptions of the use and operation of biasing elements 316 and 318 with respect to the relative positioning and movements of damper elements 276 and 278 are equally applicable to biasing elements 646 and 648 as well as damper elements 576 and 578.

Figure 11:
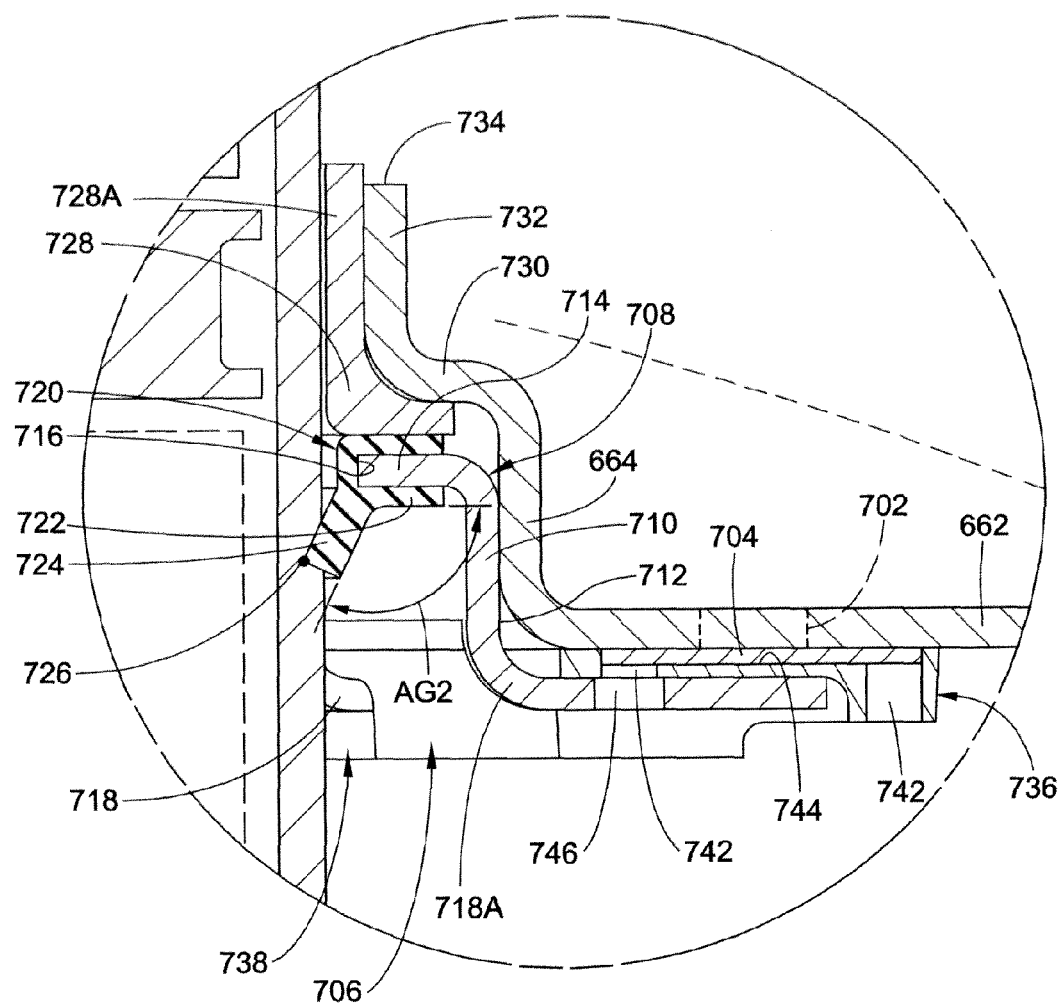
FIG. 11 is a greatly enlarged view of the portion of the gas spring and gas damper assembly in FIGS. 9 and 10 identified as Detail 11 in FIG. 10.
Figure 12:
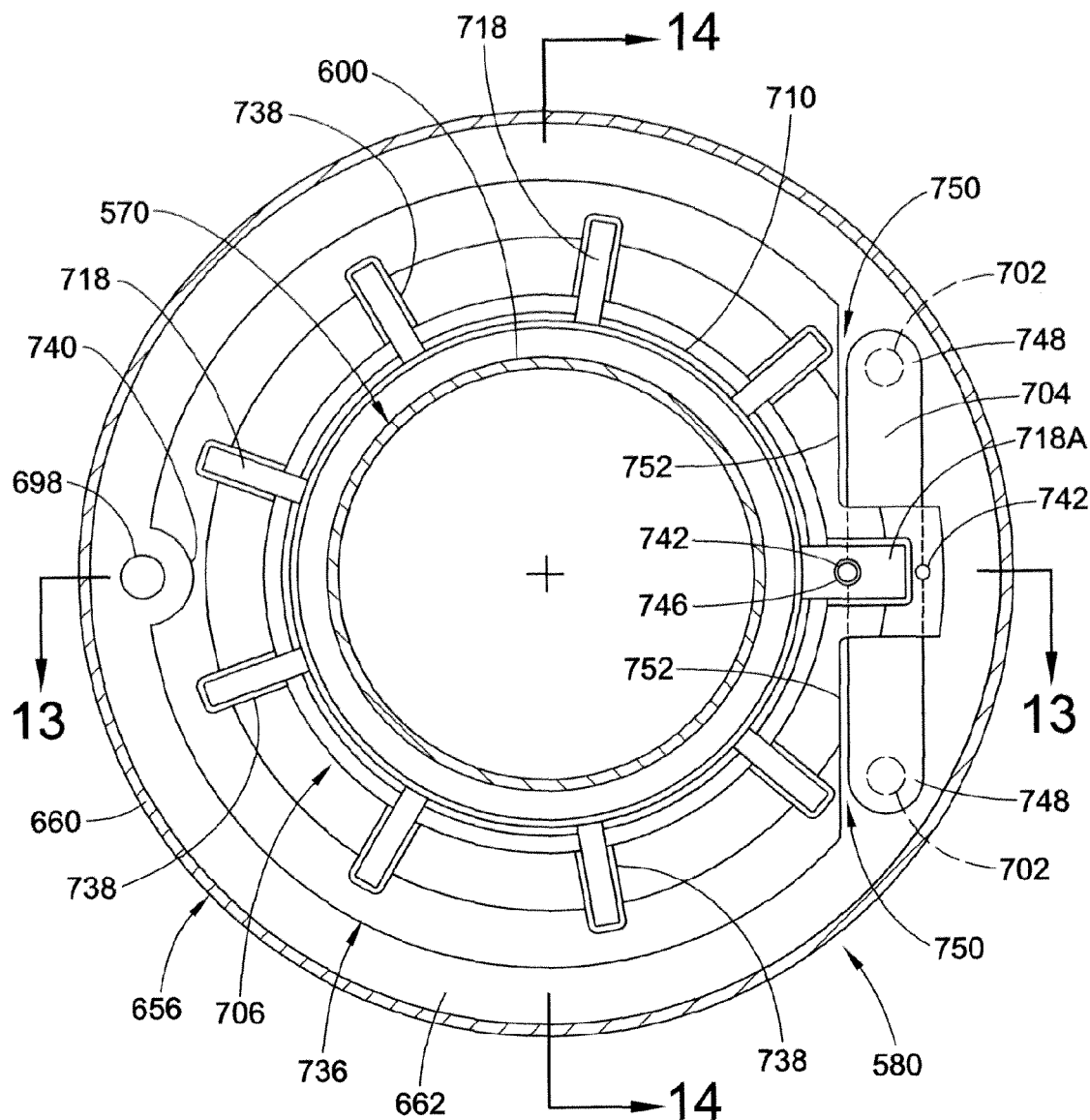
FIG. 12 is a bottom plan view, in cross-section, of a portion of the gas spring and gas damper assembly shown in FIGS. 9-11 taken from along line 12-12 in FIG. 10.
Figure 13:
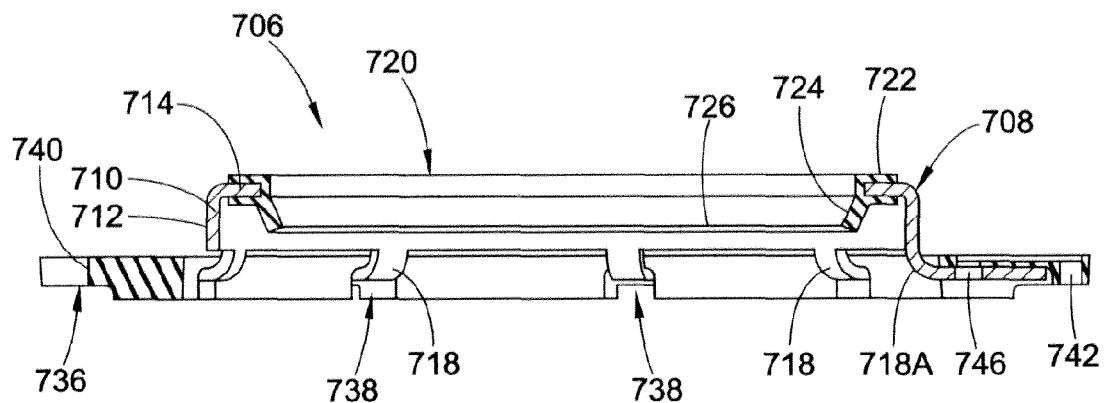
FIG. 13 is a cross-sectional side view of the cylinder end assembly shown in FIGS. 9-12 taken from along line 13-13 in FIG. 12.
Figure 14:
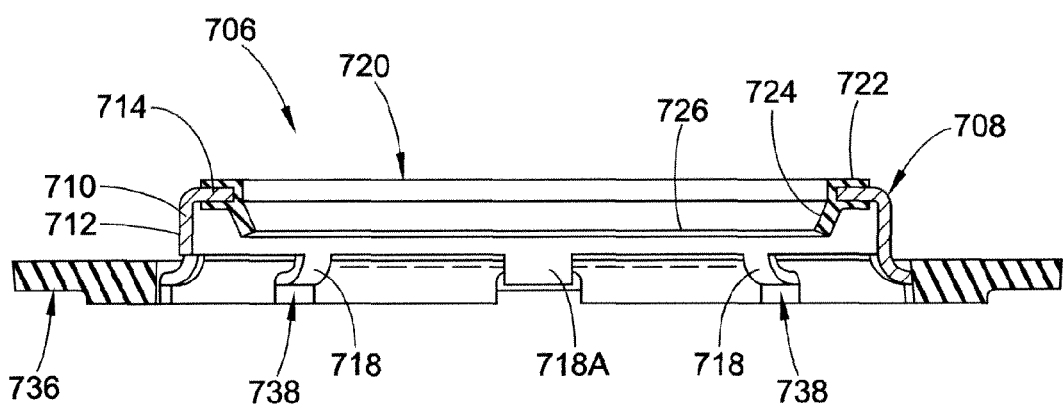
FIG. 14 is a cross-sectional side view of the cylinder end assembly shown in FIGS. 9-13 taken from along line 14-14 in FIG. 12.

Damper element 580 is shown in FIGS. 9-11 as extending longitudinally between opposing ends 650 and 652 and including an end wall 654 disposed along end 650 and housing wall 656 that is secured to end wall 654 and at least partially defines a damping chamber 658 therebetween. End wall 654 can be operatively connected on or along the second end member (e.g., piston 508) in a suitable manner. As illustrated in FIG. 9, for example, housing wall 656 is shown as including a side wall portion 660 extending longitudinally from along end wall 654 toward an end wall portion 662 of the housing wall. End wall portion 662 of housing wall 656 includes a passage wall portion 664 that at least partially defines a damper passage (not numbered) extending therethrough. End wall 654 and housing wall 656 can be operatively connected to one another in any suitable manner. For example, a threaded connection (not shown) or a flow-material joint (not shown) could be used. Alternately, as shown in FIG. 9, a crimped or other deformed material joint 668 could be used. In some cases, it may be desirable to form a substantially fluid-tight connection between the end wall and the housing wall. In other cases, a less fluid-tight connection could be used, such as a deformed material joint, for example.

As discussed above, damper elements 578 and 580 are operatively interengaged with one another for telescopic extension and compression. In the exemplary arrangement shown, a portion of damper element 578 is disposed within damping chamber 658 such that side wall 600 and end cap 618 of damper element 578 extend longitudinally-outwardly of damping chamber 658 through the damper passage (not numbered) that is at least partially defined by passage wall portion 664. As such, end 602 of damper element 578 is disposed outwardly of damping chamber 658 and end 604 of damper element 578 is disposed within damping chamber 658, such that damper piston 610 extends radially-outwardly toward side wall portion 660 of housing wall 656 and separates damping chamber 658 into chamber portions 658A and 658B.

In some cases, it may be desirable to permit fluid communication between chamber portions 658A and 658B, such as by including one or more friction-reducing bushings or wear bands disposed along the interface between side wall 600 and passage wall portion 664 of housing wall 656 and/or along the interface between outer piston wall 630 and side wall portion 660 of housing wall 656. In a preferred embodiment, however, chamber portions 658A and 658B are maintained in fluidic isolation from one another, such as by including one or more sealing elements operatively disposed between side wall 600 and passage wall portion 664 of housing wall 656. Additionally, such a preferred arrangement can include one or more sealing elements (not shown) disposed between outer piston wall 630 and side wall portion 660 of housing wall 656 such that a substantially fluid-tight seal is formed therebetween.

As discussed above, damper elements 578 and 580 are operatively interengaged with one another for telescopic extension and compression. As such, damper piston 610 of damper element 578 moves toward and away from end wall 654 of damper element 580 during operation and use of the gas damper assembly. A bumper or other cushioning element can, optionally, be disposed within either or both of chamber portions 658A and/or 658B such as may be useful to prevent or at least minimize the possibility of direct physical contact between damper piston 610 of damper element 578 and end wall 654 and/or end wall portion 662 of housing wall 656. As shown in FIGS. 9 and 10, a bumper 670 is disposed within chamber portion 658B and is supported along and secured to end wall 654 of damper element 580. It will be appreciated, however, that any other suitable arrangement could alternately be used. For example, the bumper could alternately be secured on along piston base wall 608 of damper element 578.

End wall 654 can also include a piston stop 672 that projects axially outwardly from along end wall 654 toward end 652 of damper element 580. Piston stop 672 is at least partially defined by an outer side wall 674 and an end wall 676. Outer side wall 674 can be of any suitable shape and/or configuration, such as cylindrical, for example. And, outer side wall 674 can be of any suitable cross-sectional size or dimension, such as is represented in FIG. 10 by reference dimension D8. Outer side wall 674 can extend outwardly in a direction toward end 652 by a predetermined distance, such as is represented in FIG. 10 by reference dimension D9. In a preferred arrangement, piston stop 674 is of suitable size, such as is represented by dimension D8, and suitable length, such as is represented by dimension D9, to fit into and out of piston passage 614 and thereby extend through piston base wall 608. In such case, end wall 596 of piston stop 592 and end wall 676 of piston stop 672 can abuttingly interengage one another and thereby transfer loads and/or forces from damper element 576 to end wall 654 of damper element 580 without transferring loads and/or forces directly through the interconnection between end wall 654 and housing wall 656. Additionally, such a construction may be useful in avoiding the application of a load associated with the full displacement of the damper elements to bumper 670. Though shown as being integrally formed with end wall 654, piston stop 672 could be separately provided and secured on or along the end wall using a suitable securement arrangement, such as a threaded fastener connection, a snap-fit connection or a press-fit connection, for example.

Additionally, end wall 654 of damper element 580 can be operatively connected on or along the second end member (e.g., piston 508) in any suitable manner, such as through the use of a high-articulation misalignment mount 678, for example. It will be appreciated that the construction, operation and interconnection of high-articulation misalignment mount 678 between damper element 580 and piston 508 can be substantially similar to the function, operation and interconnection of high-articulation misalignment mount 352 between damper element 280 and piston 208, such as has been described in detail above in connection with FIGS. 3-7. For purposes of brevity and ease of reading, a full detailed description of misalignment mount 678 and the components thereof is not repeated here. However, it is to be distinctly understood that the foregoing description of misalignment mount 352 as well as the operation and interconnection thereof between damper element 280 and piston 208 is equally applicable to misalignment mount 678 between damper element 580 and piston 508.

High-articulation misalignment mount 678 is shown in FIGS. 9 and 10 as including a mount socket 680 that is operatively connected to base member 532 by way of an opening (not numbered) extending therethrough and at least partially defined by an opening wall 682. The mount socket can be secured along base member 532 in any suitable manner, such as by using a flowed-material joint 684, for example, such that a substantially fluid-tight seal is formed therebetween.

A mounting member 686 is received in and supported on mount socket 680. One or more sealing elements, such as sealing elements 688, for example, can be disposed between the mount socket and the mounting member such that a substantially fluid-tight seal is formed therebetween. Mounting member 686 differs from mounting member 376 described above in that mounting member 686 includes two mounting studs 690 that projects axially-outwardly beyond outside surface 566. Mounting studs 690 include a plurality of threads suitable for receiving a corresponding securement device, such as threaded nuts 692, for example. As shown in FIG. 9, mounting studs 690 are operatively connected along lower structural component LSC using the threaded nuts. The use of two mounting studs that are laterally spaced from one another, such as mounting studs 690, for example, can provide self-alignment and anti-rotation features that may not be available where a single mounting stud is used. Additionally, the use of two mounting studs can permit the use of smaller mounting holes, which may provide for improved structural integrity of the associated mounting component.

High-articulation misalignment mount 678 can also include a joint end 694 that is operatively connected to mounting member 686 and is capable of undergoing angular displacement relative thereto. Joint end 694 can include a mounting stud 696 that is adapted for securement on or along end wall 654, such as by way of a threaded connection, for example. Mounting member 686 includes a spherical joint surface that is complimentary to a corresponding spherical joint surface on joint end 694 such that the joint end can undergo angular deflection about centerpoint or pivot CP1 (FIG. 9), such as has been described above.

As discussed above, sealing elements can be respectively disposed between side wall 600 and passage wall portion 664 of housing wall 656 and/or between outer piston wall 630 and side wall portion 660 of housing wall 656, such that a substantially fluid-tight seals can be formed therebetween. If such sealing elements are provided, it may be desirable, in some cases, to permit fluid transfer into, out of and/or between chamber portions 658A and 658B depending upon the desired performance characteristics of gas damper assembly 504.

For example, the arrangement shown in FIGS. 9-11 includes a substantially fluid-tight seal formed between chamber portions 658A and 658B across damper piston 610. In some cases, damper piston 610 may include a passage or port (not shown) extending through the piston wall that would permit fluid communication between chamber portions 658A and 658B through or otherwise across the damper piston. In the alternative, housing wall 656 and/or end wall 654 can include one or more passages or ports extending therethrough that will permit pressurized gas transfer into and out of chamber portion 658A and/or 658B. For example, end wall portion 662 of housing wall 656 can include one or more passage or ports 698 (FIGS. 10 and 12) extending therethrough that permit pressurized gas transfer into and out of chamber portion 658A of damping chamber 658. Additionally, end wall 654 can include one or more passages or ports 700 (FIG. 9) extending therethrough that permit pressurized gas transfer into and out of chamber portion 658B of damping chamber 658.

Furthermore, one or more of the passages or ports provided on or along the walls or wall portions (e.g., end wall 654, and portions 660 and/or 662 of housing wall 656) of damper element 580 can optionally include one or more flow control valves that restrict or otherwise control pressurized gas flow through corresponding passages or ports in one or more directions of flow. For example, end wall portion 662 includes one or more passages or ports 702 (FIGS. 10-12) that extend therethrough. A unidirectional or single direction flow control valve of a suitable type, kind and/or construction is disposed on or along the end wall portion and restricts pressurized gas flow to a single direction. In the exemplary arrangement shown in FIGS. 9-12, a one-way valve 704 (FIGS. 11 and 12) is fluidically associated with passages 702 and permit pressurized gas transfer into chamber portion 658A through passages 702 while substantially inhibiting pressurized gas transfer out of chamber portion 658A through passages 702. As such, in the exemplary arrangement shown, pressurized gas transfer out of chamber portion 658A occurs only through the remaining one or more of passages 698.

Gas damper assembly 504 can also include an end assembly that is supported along end 652 of damper element 580 and is operatively disposed between damper elements 578 and 580. The end assembly can include one or more bearing elements, such as for providing reduced-friction or wear resistance between the damper elements, for example. The end assembly can also include one or more sealing elements, such as for reducing communication or transfer of fluid (e.g., pressurized gas) between the damper elements. The end assembly can, optionally, further include one or more bumper elements, such as may be used to inhibit or minimize contact between two or more components of the damper elements. The end assembly can, optionally, also include one or more retaining elements, such as may be suitable for supporting or otherwise retaining one or more bearing elements, one or more sealing element, one or more bumper elements and/or other components on or along the end of the damper element.

In the exemplary arrangement shown in FIGS. 9-14, end assembly 706 is shown as including a seal case 708 that is dimensioned for securement on or along housing wall 656 of damper element 580. As shown in FIGS. 11-14, seal case 708 can include a side wall 710 that extends in a generally axial direction and has an outside surface 712. A seal support wall 714 extends radially-inwardly from along side wall 710 and terminates at an inner end wall 716 (FIG. 11) that is spaced radially-outwardly from side wall 600 of damper element 578. A plurality of tabs 718 are spaced circumferentially along side wall 710. The tabs extend axially-outwardly from along the side wall in a direction opposite seal support wall 714 and project radially-outwardly beyond side wall 710. In a preferred arrangement, side wall 710 is dimensioned to be pressed into the passage (not numbered) formed by passage wall portion 664 such that an interference fit is formed therebetween, such as may be used to retain the seal case and any associated components or element in position on or along end 652 of damper element 580. It will be appreciated, however, that other arrangements could alternately be used. For example, one or more securement elements (e.g., threaded fasteners or snap-fit features) and/or a flowed-material joint could be used to secured or otherwise at least partially retain the seal case in position on or along the end of the damper element.

End assembly 706 is also shown as including a sealing element 720 that is secured along seal support wall 714 of seal case 708. Sealing element 720 includes a base portion 722 that is supported along opposing surfaces of seal support wall 714 such that inner end wall 716 is at least partially encapsulated by the base portion. Sealing element 720 also includes a sealing lip 724 that projects radially-inwardly from along base portion 722 and is dimensioned to abuttingly engage side wall 600 of damper element 578. Sealing lip 724 can project from base portion 722 at a non-zero angle, such as an angle within a range of from approximately 95 degrees to approximately 175 degrees, as is represented in FIG. 11 by dimension AG2, for example. The sealing lip can terminate at a radially-inward edge 726 that can form a contact area for abuttingly engaging the component wall associated therewith (e.g., side wall 600). Sealing element can be formed in any suitable manner and from any suitable material or combination of materials. In a preferred arrangement, sealing element 720 can be formed from an elastomeric polymer (e.g., rubber, polyurethane) that is over-molded along seal support wall 714. It will be appreciated, however, that other methods of manufacture could alternately be used. For example, the sealing element could be separately provided and installed on or along the seal support wall prior to assembly with the housing wall.

End assembly 706 can also, optionally, include one or more bearing elements. In the exemplary arrangement shown in FIGS. 9-11, a bushing 728 is disposed between damper elements 578 and 580, such as may be useful for reducing frictional forces and/or providing improved wear during relative movement between the components. It will be appreciated that bushing 728 can be secured on or along damper element 580 in any suitable manner. For example, the bushing could be assembled together with the seal case such that the bushing and seal case are together installed on or along the housing wall of the damper element. As another example, as shown in FIG. 11, housing wall 656 can include retaining wall portions 730 and 732. Retaining wall portion 730 is shown as extending radially-inwardly from along passage wall portion 664. Retaining wall portion 732 extends axially-outwardly from portion 730 in a direction opposite passage wall portion 664 and terminates at a distal edge 734. At least a portion of bushing 728 is shown as being captured between seal case 708 and retaining wall portion 730, which maintains bushing 728 in a substantially-fixed axial position relative thereto. Retaining wall portion 732 is spaced radially-outwardly from side wall 600 of damper element 578, and bushing 728 can, optionally, include a wall portion 728A that extends axially toward distal edge 734.

End assembly 706 can also, optionally, include one or more bumper or cushioning elements such as may be used to inhibit or minimize contact between two or more components of damper elements 578 and 580. As discussed above, damper piston 610 of damper element 578 moves toward and away from end wall portion 662 of damper element 580 during operation and use of the gas damper assembly. In the exemplary arrangement shown in FIGS. 9-14, a bumper 736 can, optionally, be disposed within chamber portion 658A such as may be useful to prevent or at least minimize the possibility of direct physical contact between damper piston 610 of damper element 578 and end wall portion 662 of housing wall 656. Bumper 736 is supported along end wall portion 662 and in abutting engagement therewith by tabs 718 of seal case 708. Bumper 736 can optionally include one or more slots or notches 738 formed thereinto that are dimensioned to at least partially receive tabs 718 and thereby minimize contact between the tabs and damper piston 610 of damper element 578. Additionally, other alignment and/or clearance features, such as a radially-inwardly extending notch 740 adjacent passage 698 and/or alignment holes 742, for example, can optionally be included. It will be appreciated, however, that other suitable arrangement could alternately be used. For example, the bumper could alternately be secured on along piston base wall 608 of damper element 578.

The one or more flow control valves, if provided, can be operatively associated with the corresponding passages or ports in any suitable manner. As one example, valve 704, if included, can be secured on or along end wall portion 662 within chamber portion 658A. In the exemplary arrangement shown, valve 704 is at least partially received within a groove (not numbered) in bumper 736 that is at least partially formed by a groove wall 744. Groove wall 744 and valve 704 are urged toward and into abutting engagement with end wall portion 662 by a tab 718A that includes an alignment hole 746 in approximate alignment with one of alignment holes 742. Valve 704 includes a central portion (not numbered) and at least one distal end 748 disposed outwardly therefrom in transverse relation to axis AX. In the exemplary arrangement shown in FIG. 12, valve 704 includes two, opposing distal ends that each extend across one of passages 702 to permit fluid transfer through the passages in at least one direction. To permit distal ends 748 deflect in response to a predetermined differential pressure level between spring chamber 512 and chamber portion 658A, notches 750 formed at least in part by notch walls 752 can be provided along bumper 736. It will be appreciated, however, that other arrangements could alternately be used.

Gas spring and gas damper assembly 500 can optionally include any number or one or more additional element, features and/or components. For example, a distance sensing device can be operatively connected on or along one of the components of the gas spring assembly or the gas damper assembly. As shown in FIGS. 9 and 10, for example, a height sensor 754 can be operatively secured on or along end wall portion 662 of housing wall 656 and can transmit suitable electromagnetic or ultrasonic waves WVS in an approximately longitudinal direction toward bead plate 506. It will be appreciated, however, that other arrangements could alternately be used.

Figure 15:
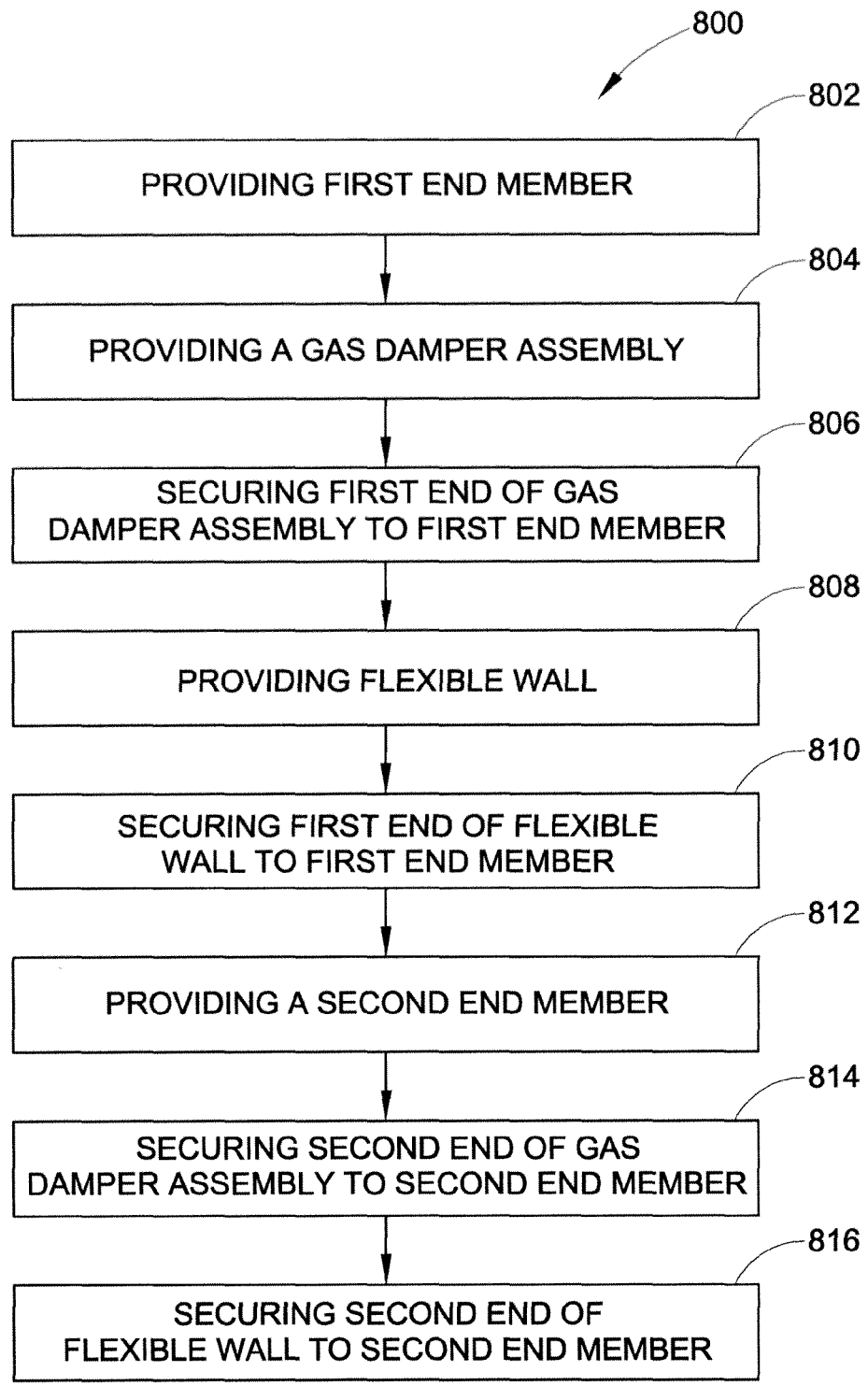
FIG. 15 is a graphical representation of one example of a method of assembling a gas spring and gas damper assembly in accordance with the subject matter of the present disclosure.

One example of a method of assembling a gas spring and gas damper assembly in accordance with the subject matter of the present disclosure, such as gas spring and gas damper assemblies 200 and/or 500, for example, is illustrated in FIG. 15 as method 800. The method can include providing a first end member of the gas spring assembly (e.g., bead plate 206 of gas spring assembly 202, or bead plate 506 of assembly 502), as is represented in FIG. 15 by item number 802. Method 800 can also include providing a gas damper assembly (e.g., gas damper assembly 204 and/or 504), as is represented in FIG. 15 by item number 804. The method can further include securing a first end (e.g., end 272 or 572) of the gas damper assembly on or along the first end member, as is represented by item number 806. Method 800 can further include providing a flexible wall (e.g., flexible wall 210 or 510), as is represented by item number 808, and securing a first end (e.g., end 214 or 514) of the flexible wall on or along the first end member, as is represented in FIG. 15 by item 810. Method 800 can also include providing a second end member (e.g., piston 208 or 508), as is represented by item number 812, and securing a second end (e.g., end 274 or 574) of the gas damper assembly on or along the second end member, as is represented in FIG. 15 by item number 814. Method 800 can further include securing a second end (e.g., end 216 or 516) of the flexible wall on or along the second end member, as is represented in FIG. 15 by item number 816.

Figure 16:
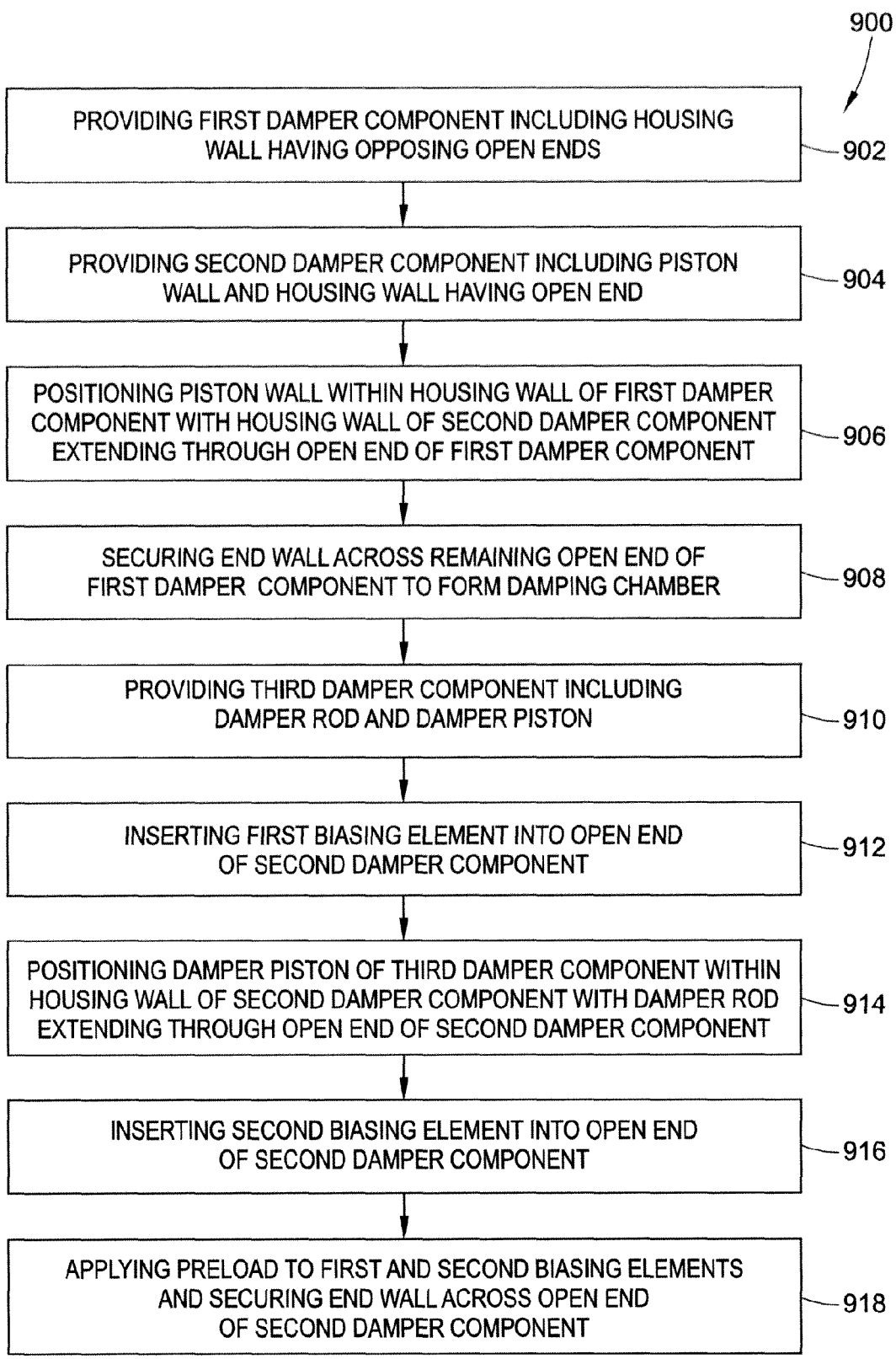
FIG. 16 is a graphical representation of one example of a method of assembling a gas damper assembly in accordance with the subject matter of the present disclosure.

One example of a method of assembling a gas damper assembly in accordance with the subject matter of the present disclosure, such as gas damper assembly 204 and/or 504, for example, is illustrated in FIG. 16 as method 900. The method can include providing a first damper component including a housing wall (e.g., housing wall 326 or 656) having opposing open ends (e.g., the damper passage at least partially defined by passage wall 334 and the open end formed by side wall portion 330 along end 322), as is represented in FIG. 16 by item number 902. Method 900 also includes providing a second damper component including a housing wall (e.g., side wall 294 or 600) having an open end (e.g., the open end formed by side wall 294 along end 296) and a piston wall (e.g., piston wall 302 or 608), as is represented by item number 904. Method 900 can further include positioning the piston wall within the housing wall (e.g., housing wall 326 or 656) of the first damper component with the housing wall (e.g., side wall 294 or 600) of the second damper component extending through an open end (e.g., the damper passage at least partially defined by passage wall 334) of the first damper component, as is represented in FIG. 16 by item number 906. Method 900 can also include securing an end wall (e.g., end wall 324 or 654) across the remaining open end (e.g., the open end formed by side wall portion 330 along end 322) to form a damping chamber (e.g., damping chamber 328 or 658), as is represented by item number 908.

Method 900 can also include providing a third damper component including a damper rod (e.g., damper rod 282 or 582) and a damper piston (e.g., damper piston 288 or 588), as is represented in FIG. 16 by item number 910. Method 900 can further include providing a first biasing element (e.g., biasing element 318 or 648) and inserting the first biasing element into a damping chamber (e.g., damping chamber 300 or 606) of the second damper component, as is represented by item number 912. Method 900 can also include positioning the damper piston (e.g., damper piston 288 or 588) within the damping chamber (e.g., damping chamber 300 or 606) defined by the housing wall (e.g., side wall 294 or 600) with the damping rod (e.g., damping rod 282 or 582) projecting outwardly from the open end (e.g., the open end formed by side wall 294 along end 296) of the housing wall, as is represented by item number 914. Method 900 can further include providing a second biasing element (e.g., biasing element 316 or 646) and inserting the second biasing element into the damping chamber of the second damper component, as is represented in FIG. 16 by item number 916. Method 900 can also include applying a preload to the first and/or second biasing elements (e.g., biasing elements 318 and 316, and/or 648 and 646) and securing an end wall (e.g., end wall 306 or end cap 618) across the open end of the housing wall of the second damper component, as is represented in FIG. 16 by item number 918.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic" and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein and whether or not initially presented in herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A gas spring and gas damper assembly comprising:
   a gas spring assembly having a longitudinal axis and including:
      a first end member;
      a second end member spaced longitudinally from said first end member; and,
      a flexible wall extending circumferentially about said longitudinal axis and being operatively connected between said first and second end members such that a spring chamber is at least partially defined therebetween; and,
   a gas damper assembly disposed within said spring chamber and operatively connected between said first and second end member, said gas damper assembly including:
      a first damper element disposed within said spring chamber and including a first side wall at least partially defining a first damping chamber;
      a second damper element extending longitudinally between a first end of said second damper element and a second end of said second damper element opposite said first end of said second damper element, said second damper element including an end wall and a second side wall at least partially defining a second damping chamber with at least one of said first and second damping chambers in fluid communication with said spring chamber, said end wall disposed transverse to said second side wall and at least partially forming a second element piston, said second damper element being oriented such that said second element piston and at least a portion of said second side wall are disposed within said first damping chamber, said second damper element being slidably supported within said first damping chamber such that said end wall is displaceable relative to said first side wall of said first damper element; and,
      a third damper element extending longitudinally between a first end of said third damper element and a second end of said third damper element opposite said first end of said third damper element, said third damper element including a damper rod and a third element piston, said damper rod extending from said first end of said third damper element toward said second end of said third damper element, said third element piston disposed along said damper rod toward said second end of said third damper element, said third damper element being oriented such that said third element piston and at least a portion of said damper rod are disposed within said second damping chamber, said third damper element being displaceable relative to said second side wall of said second damper element;
   a first mount capable of undergoing resilient angular deflection and operatively connecting one of said first damper element and said third damper element to said first end member of said gas spring assembly, said first mount including a retainer plate supported on said first end member in axially spaced relation thereto such that a mounting cavity having an open outer periphery is formed therebetween; and,
   a second mount operatively connecting the other of said first damper element and said third damper element to said second end member of said gas spring assembly.

2. A gas spring and gas damper assembly according to claim 1, wherein said first mount includes an end plate, a first bushing element and a second bushing element, said end plate having a first surface, a second surface opposite said first surface and being operatively connected to said one of said first damper element and said third damper element, said first bushing element disposed in abutting engagement with said first surface of said end plate, and said second bushing element disposed in abutting engagement with said second surface of said end plate.

3. A gas spring and gas damper assembly according to claim 2, wherein said first and second bushing elements are formed from an elastomeric material that will permit said first and second bushing elements to deform as said first end member and said one of said first damper element and said third damper element undergo angular displacement relative to one another.

4. A gas spring and gas damper assembly according to claim 3, wherein said deformation of said first and second bushing elements permit said first end member and said one of said first damper element and said third damper element to undergo an angular displacement within a range of from approximately 2 degrees to approximately 15 degrees.

5. A gas spring and gas damper assembly according to claim 2, wherein said retainer plate supports said end plate, said first bushing element and said second bushing element along said first end member.

6. A gas spring and gas damper assembly according to claim 5, wherein said retainer plate includes an inner side wall that at least partially defines a passage extending through said retainer plate, said one of said first damper element and said third damper element extends through said passage and abuttingly engages said end plate.

7. A gas spring and gas damper assembly according to claim 6, wherein at least said second bushing element includes an inner side wall at least partially defining an opening extending through said second bushing element with said one of said first damper element and said third damper element extending through said opening and abuttingly engaging said end plate.

8. A gas spring and gas damper assembly according to claim 5, wherein said retainer plate is secured along said first end member such that said end plate is compressively captured between said first and second bushing elements.

9. A gas spring and gas damper assembly according to claim 8, wherein said first bushing element is compressively captured between said end plate and said first end member, and said second bushing element is compressively captured between said end plate and said retainer plate.

10. A gas spring and gas damper assembly according to claim 8, wherein said first end member includes a plurality of mounting studs extending therefrom into said spring chamber, and said retainer plate is secured to said plurality of mounting studs in spaced relation to said first end member.

11. A gas spring and gas damper assembly according to claim 5, wherein said first mount includes a bumper secured along said retainer plate opposite said second bushing element, said bumper dimensioned to abuttingly engage said second damper element upon relative displacement of said first end member and said second damper element toward one another.

12. A method of assembling a gas spring and gas damper assembly, said method comprising:
providing a first damper element including a first side wall at least partially defining a first damping chamber;
providing a second damper element extending longitudinally between a first end and a second end opposite said first end, said second damper element including an end wall and a second side wall at least partially defining a second damping chamber, said end wall disposed transverse to said second side wall and at least partially forming a second element piston;
positioning said second element piston and at least a portion of said second side wall within said first damping chamber such that said second damper element is slidably supported within said first damping chamber and said second element piston is displaceable relative to said first side wall of said first damper element;
providing a third damper element including a damper rod and a third element piston disposed along said damper rod;
positioning said third damper element such that said third element piston and at least a portion of said damper rod are disposed within said second damping chamber;
providing a first end member, a second end member and a flexible wall;
providing a first mount capable of undergoing resilient angular deflection, said first mount including a retainer plate;
securing said retainer plate on said first end member in axially spaced relation to said first end member such that a mounting cavity having an open outer periphery is formed between said end member and said retainer plate;
securing one of said first and third damper elements to said first end member using said first mount such that said first end member and said one of said first damper element and said third damper element are capable of undergoing angular displacement relative to one another;
providing a second mount and securing the other of said first and second damper elements to said second end member using said second mount; and,
securing said flexible wall between said first and second end members such that a spring chamber is at least partially formed by said flexible wall between said first and second end members with said spring chamber containing at least said first, second and third damper elements and in fluid communication with at least one of said first and second damping chambers.

13. A method according to claim 12 further comprising:
providing an end plate and securing said end plate to said one of said first damper element and said third damper element.

14. A method according to claim 13 further comprising:
providing first and second bushing elements; and,
positioning said first bushing element along a first side of said end plate and positioning said second bushing element along a second side of said end plate such that said end plate is disposed between said first and second bushing elements.

15. A method according to claim 14, wherein
securing said retainer plate on said first end member includes compressively capturing said end plate and said first and second bushing elements between said retainer plate and said first end member.

16. An assembly comprising:
a gas spring assembly having a longitudinal axis and including:
a first end member;
a second end member spaced longitudinally from said first end member; and,
a flexible wall extending circumferentially about said longitudinal axis and being operatively connected between said first and second end members such that a spring chamber is at least partially defined therebetween; and,
an internally-mounted device disposed within said spring chamber and operatively connected between said first and second end member, said internally-mounted device including a first end, a second end opposite said first end, and a device chamber in fluid communication with said spring chamber of said gas spring assembly such that pressurized gas transfers between said spring chamber and said device chamber;

a first mount capable of undergoing resilient angular deflection and operatively connecting said first end of said internally-mounted device to said first end member of said gas spring assembly, said first mount including:
 a retainer plate that is supported in spaced relation to said first end member such that a space is formed between said end member and said retainer plate;
 an end plate operatively connected to said first end of said internally-mounted device, said end plate having a first surface facing toward said first end member and a second surface opposite said first surface facing toward said retainer plate;
 a first bushing element disposed in abutting engagement between said first surface of said end plate and said first end member; and,
 a second bushing element disposed in abutting engagement between said second surface of said end plate and said second end member; and, a second mount operatively connecting said second end of said internally-mounted device to said second end member of said gas spring assembly.

17. An assembly according to claim 16, wherein said first and second bushing elements are formed from an elastomeric material that will permit said first and second bushing elements to deform as said first end member and said internally-mounted device undergo angular displacement relative to one another.

18. An assembly according to claim 16, wherein said retainer plate supports at least one of said end plate, said first bushing element and said second bushing element along said first end member, said retainer plate being secured along said first end member such that said end plate is compressively captured between said first and second bushing elements.

19. An assembly according to claim 18, wherein said first mount includes a bumper secured along said retainer plate opposite said second bushing element.

20. An assembly according to claim 16, wherein said internally-mounted device includes a pressurized gas damper assembly with said device chamber defined therein.

\* \* \* \* \*